United States Patent
Jiang et al.

(10) Patent No.: US 6,738,186 B2
(45) Date of Patent: May 18, 2004

(54) MULTI-MODE ERBIUM MICRO FIBER AMPLIFIER (EMFA)

(75) Inventors: Shibin Jiang, Tucson, AZ (US); Sergio Brito Mendes, Tucson, AZ (US); Gualtiero Nunzi Conti, Tucson, AZ (US); Dan T. Nguyen, Tucson, AZ (US); Ewan Malcolm Wright, Tucson, AZ (US); Arturo Chavez-Pirson, Tucson, AZ (US); Yushi Kaneda, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 127 days.

(21) Appl. No.: 10/095,322

(22) Filed: Mar. 11, 2002

(65) Prior Publication Data

US 2003/0169489 A1 Sep. 11, 2003

Related U.S. Application Data

(63) Continuation-in-part of application No. 09/589,764, filed on Jun. 9, 2000, now Pat. No. 6,611,372, and a continuation-in-part of application No. PCT/US01/14849, filed on Jun. 11, 2001.

(51) Int. Cl.[7] .................................................. H01S 3/00
(52) U.S. Cl. .................................................. 359/341.5
(58) Field of Search .................................... 359/341.5

(56) References Cited

U.S. PATENT DOCUMENTS

| | | | |
|---|---|---|---|
| 3,729,690 A | 4/1973 | Snitzer | 331/94.5 |
| 3,808,549 A | 4/1974 | Maurer | 331/94.5 |
| 4,815,079 A | 3/1989 | Snitzer et al. | 372/6 |
| 5,930,030 A | 7/1999 | Scifres | 359/341 |
| 6,512,879 B1 * | 1/2003 | Beguin et al. | 385/142 |
| 6,611,372 B1 * | 8/2003 | Peyghambarian et al. | 359/341.1 |
| 2003/0048524 A1 * | 3/2003 | Chavez-Pirson et al. | 359/333 |

OTHER PUBLICATIONS

T. Nishi et al., The amplification properties of highly Er+3 doped phosphate fiber, Jpn. J. Appl. Phys., vol. 31, 1992, Pt. 2, 2B, pp. L177–L179.

A.F. Garito et al., Effects of Random Perturbations in Plastic Optical Fibers, Science, Aug. 14, 1998, vol. 281, pp. 962–967.

I.A. Grishin et al., Up–conversion Luminescence in Er3+– and Yb3+–doped Fluorozirconate Glasses, Optical Fiber Technology 1, 1995, pp. 331–334.

Mirek Karasek, Optimum Design of Er3+–Yb3+ Codoped Fibers for Large–Signal High–Pumped–Power Applications, IEEE Journal of Quantum Electronics, Oct. 1997, vol. 33, No. 10, pp. 1699–1705.

(List continued on next page.)

*Primary Examiner*—Thomas G. Black
*Assistant Examiner*—Deandra M. Hughes
(74) *Attorney, Agent, or Firm*—Eric A. Gifford

(57) ABSTRACT

A compact, low-cost mid-gain Erbium Micro-Fiber Amplifier (EMFA) is provided by multi-mode pumping a micro fiber formed from a specialty multi-component glass and highly co-doped with Er:Yb. The specialty glass exhibits a much higher core absorption coefficient than standard glasses. As a result, the lower order modes are rapidly absorbed in the fiber core. The abrupt change in the mode profile perturbs the higher order modes and mode couples them into the lower order modes within a very short length of fiber, less than 20 cm. This "absorptive mode coupling" effect can double the absorption efficiency of a circular symmetric micro fiber and extend the length over which such a highly doped fiber can be efficiently inverted. The combination of multi-mode pumping with short fiber lengths reduces the form factor and cost of EMFAs.

26 Claims, 17 Drawing Sheets

OTHER PUBLICATIONS

Eric Maurice et al., Clustering effects on double energy transfer in heavily ytterbium–erbium–codoped silica fibers, J. Opt. Soc. Am. B, Apr. 1994, vol. 13, No. 4, pp. 693–701.

Ralph H. Page et al., Upconversion–pumped luminescence efficiency of rare–earth–doped hosts sensitized with trivalent ytterbium, J. Opt. Soc. Am. B, Mar. 1988, vol. 15, No. 3, pp. 996–1008.

George C. Valley, Modeling Cladding–Pumped Er/Yb Fiber Amplifiers, Optical Fiber Technology 7, 2001, pp. 21–44.

Anping Liu et al., The absorption characteristics of circular, offset, and rectangular double–clad fibers, Optics Communications 132, Dec. 15, 1996, pp. 511–518.

Dmitrii Kouznetsov et al., Efficiency of pump absorption in double–clad fiber amplifiers I. Fiber with circular symmetry, J. Opt. Soc. Am. B, Jun. 2001, vol. 18, No. 6, pp. 743–874.

Shibin Jiang et al., Net gain of 15.5 dB from a 5.1 cm–long Er+–doped phosphate glass fiber, OFC 2000 Technical Digest Series, Mar. 7–10, 2000, PD5–1—PD5–2.

Valerie Doya et al., Optimized absorption in a chaotic double–clad fiber amplifier, Optics Letters, Jun. 15, 2001, vol. 26, No. 12, pp. 872–874.

Michael R. Lange et al., High Gain Short Length Phosphate Glass Erbium–Doped Fiber Amplifier Material, OSA Optical Fiber Communications, 2001, pp. 1–8.

B.C. Hwang et al., Erbium–doped phosphate glass fibre amplifiers with gain per unit length of 2.1 dB/cm, Electronics Letters, Jun. 10, 1999, vol. 35, No. 12, pp. 1–2.

Yongdan Hu et al., Performance of High–Concentration $Er^{3+}$–$Yb^{3+}$–Codoped Phosphate Fiber Amplifiers, IEEE Photonics Technology Letters, Jul. 2001, vol. 13, No. 7, pp. 657–659.

Shibin Jiang et al., $Er^{3+}$ doped phosphate glasses and lasers, Journal of Non–Crystalline Solids 239, 1998, pp. 143–148.

Shibin Jiang et al., $Er^{3+}$–doped phosphate glasses for fiber amplifiers with high gain per unit length, Journal of Non–Crystalline Solids 263 & 264, 2000, pp. 364–368.

S. Iraj Najafi, Overview of Nd–and Er–Doped Glass Integrated Optics Amplifiers and Lasers, SPIE, vol. 2996, pp. 54–61.

\* cited by examiner

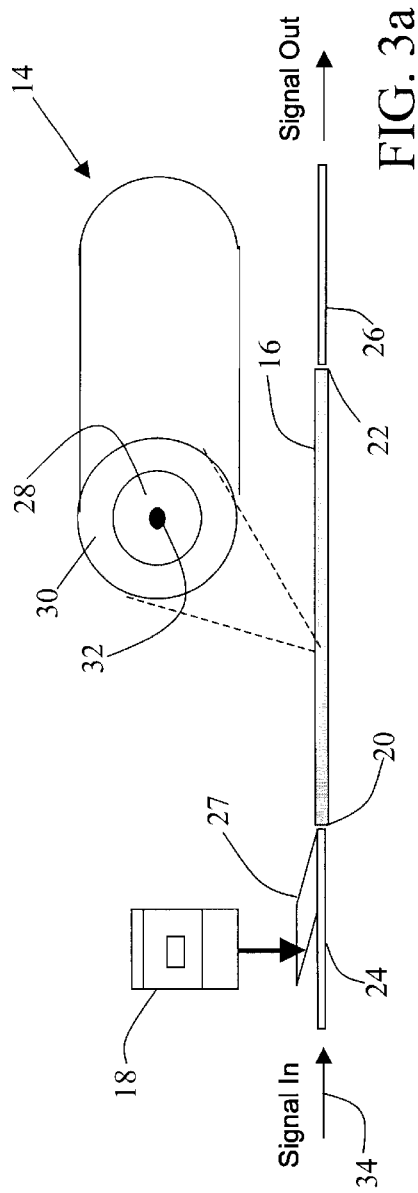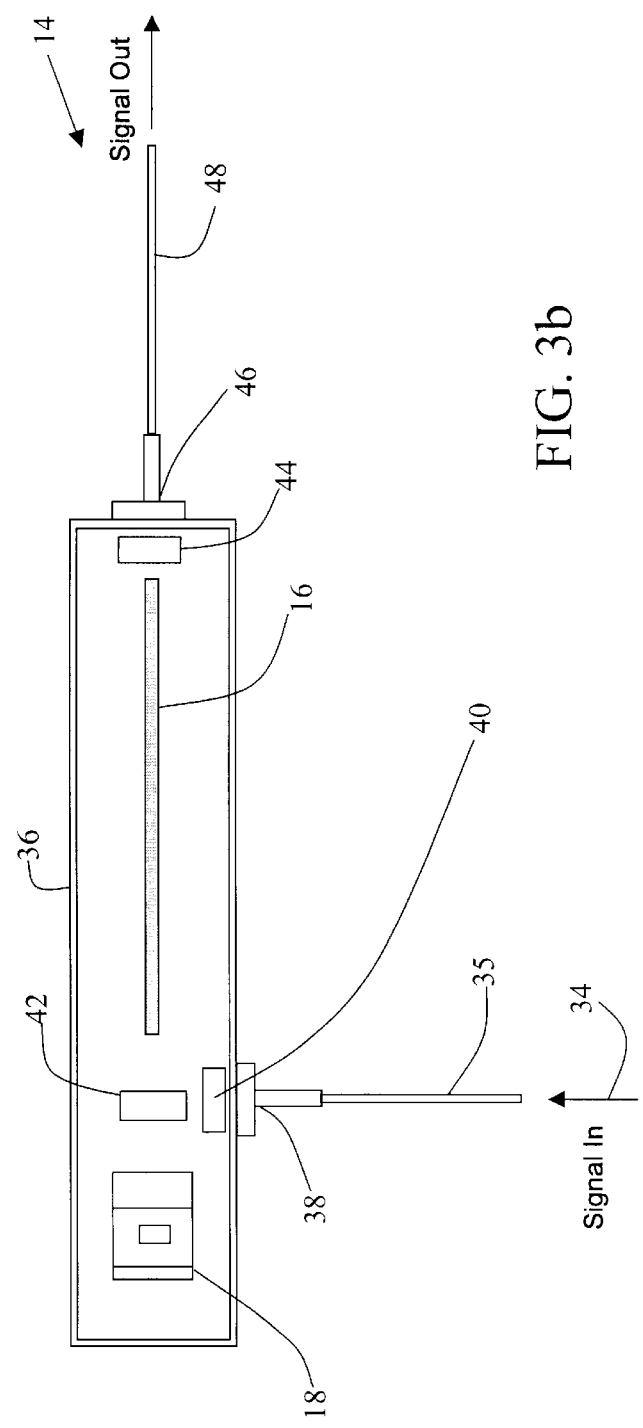

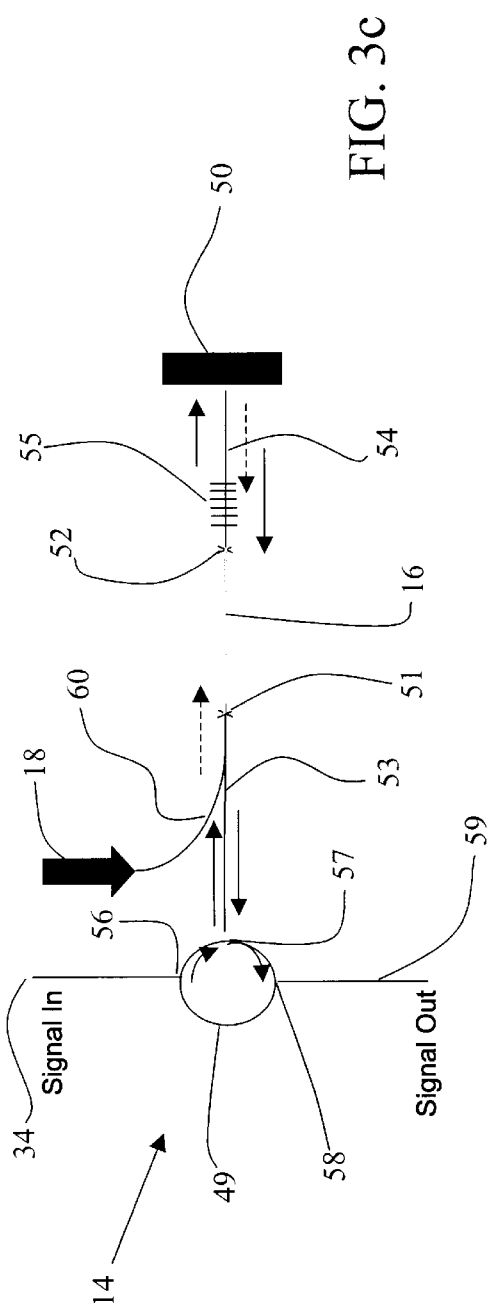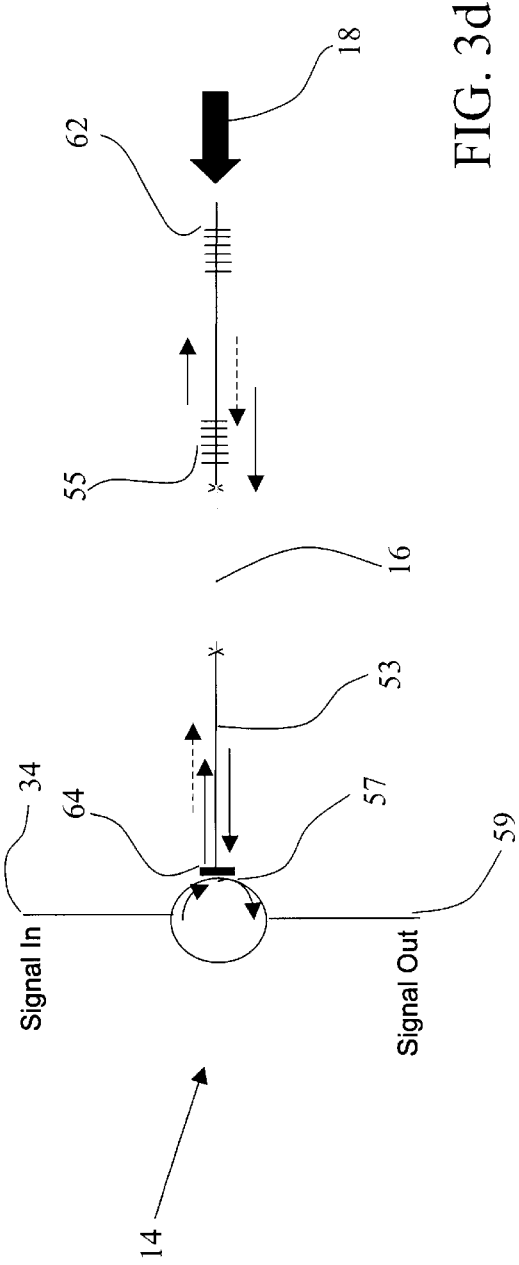
FIG. 3c
FIG. 3d

MULTI-MODE ERBIUM MICRO FIBER AMPLIFIER (EMFA)

CROSS-REFERENCE TO RELATED APPLICATIONS

This application is a continuation-in-part and claims benefit of priority under 35 U.S.C. 120 to application Ser. No. 09/589,764 now U.S. Pat. No. 6,611,372 entitled "Erbium and Ytterbium Co-Doped Phosphate Glass Optical Fiber Amplifiers Using Short Active Fiber Length" filed on Jun. 9, 2000 and PCT/US01/14849 entitled "Rare-Earth Doped Multi-Component Glass Optical Fiber Amplifiers Using Short Active Fiber Length" filed Jun. 11, 2001, the entire contents of which are incorporated by reference.

BACKGROUND OF THE INVENTION

1. Field of the Invention

This invention relates to fiber amplifiers and more specifically to multi-mode clad-pumped erbium micro fiber amplifiers (EMFAs).

2. Description of the Related Art

Significant and on-going efforts are being made to improve erbium-doped fiber amplifier (EDFA) characteristics such as gain, noise figure, saturation output power, form factor and cost. To date, most EDFAs have been deployed in the long haul or ultra-long markets, in which high gain and output power are critical parameters. The deployment into metro and access markets will require mid-gain amplifiers but at a much lower cost and smaller form factor.

To pump the laser, pump radiation at or near 980 nm must be coupled into the fiber and absorbed in the fiber core. Typically a single-mode pump laser is aligned with the fiber core to couple the pump radiation directly into the core. Absorption efficiencies are high; approximately 80% in conventional long silica fibers but the precision active alignment of the laser to the core is very expensive. More recent schemes propose coupling pump radiation from a multi-mode pump laser into the cladding surrounding the core of the silica fiber (see U.S. Pat. No. 3,808,549). Clad pumping is less expensive due to relaxed alignment tolerances but less efficient at absorbing pump power into the core than core pumping.

When multi-mode clad pumping was first considered, the belief was that the effective pump absorption per unit length would be approximately reduced by the ratio of the core/cladding area. The total pump absorption efficiency would scale linearly with $\alpha L$ where $\alpha$ is the absorption coefficient of the core and L is the length of the fiber. Hence, to effectively absorb pump light in a double clad fiber it appeared that L and/or $\alpha$ need only be increased as long as the pump power is sufficient to invert the gain medium over the length of the fiber.

The absorption coefficient can be increased by co-doping the core with ions with large absorption cross-section, as in Er:Yb doped systems. However, doping concentrations of Er:Yb in silica fiber are low, on the order of 0.01 wt. %, and the efficiency of the energy transfer process from Yb to Er is limited due to the high average distance between Yb and Er ions in the glass. The latter limits the rate for energy transfer. In addition, the efficiency is also limited by back transfer reactions from Er to Yb. The latter is affected by the lifetime of the state $I_{11/2}$ of Er. Fast transfer from the level $I_{11/2}$ to the level $I_{13/2}$ (lowest excited state from which radiative recombination to the ground level $I_{15/2}$ is observed) prevents important back transfer. As a result, codoping with ytterbium has only a marginal effect on the absorption of silica fiber. Thus, investigators sought to increase absorption efficiency by simply increasing the length L of lightly doped silica fibers.

However, empirical testing of lightly doped silica fiber revealed that after some normalized distance ($\alpha L$) the pump light absorbed in circular symmetric fibers apparently saturates (see FIG. 1). Geometric modeling explains this as follows: assuming a uniform pump intensity distribution at the input of the fiber, the pump light can be described by an ensemble of rays of differing input positions and incidence angles. Some fraction of these rays will cross the core as they propagate down the fiber and will thus be absorbed, whereas the majority of rays actually never cross the core as they orbit the core upon propagation down the fiber and are therefore not absorbed. In wave optical terms the crossing rays that intersect the core describe the lower order fiber modes that spatially overlap the core and are strongly absorbed, whereas the non-crossing rays describe the higher order modes, or whispering gallery modes, that are mainly localized in the cladding and experience relatively little absorption. Thus, from a geometrical optics perspective, once the crossing rays, or alternatively the lower order modes, are absorbed increasing $\alpha$ or L further will not improve absorption efficiency. Furthermore, increasing $\alpha$ or L beyond saturation may create a situation in which the full length of the fiber is not inverted, which reduces total gain significantly and increases noise figure.

As shown in FIG. 1, the absorption efficiency $\eta$ 10 ramps up approximately linearly with $\alpha L$ as the lower order modes are absorbed and then saturates at $\alpha L \sim 20$. The absorption curve is produced by a ray tracing simulation based on the geometric model as described in Liu et al., Optics Comm. Vol. 132, p.511–518, (1996). Based on this simulation, a fiber with a core of 6 $\mu$m diameter and an inner cladding of 100 $\mu$m, corresponding to $r_0/R_0$ of 0.06, has a maximum absorbed power is 7.6% where $r_0$ is the radius of the core and $R_0$ is the radius of the inner cladding. For small ratios of $r_0/R_0$, the maximum absorbed power can be approximated to $(4r_0/\pi R_0)$. More elaborate wave optical approaches (Kouznetsov et al., J. Opt. Soc. Am. B 18, 743 (2001)) implemented to describe double-clad fibers with circular symmetry show that the fraction of the pump absorbed by the core remains close to that predicted by the ray optics approach. Thus, to maximize amplifier gain conventional wisdom would dictate selecting $\alpha L$ just into saturation with large L and relatively small $\alpha$. Silica fibers can be made very long because their propagation losses are very small, on the order of 2 dB/km.

Subsequent empirical testing of lightly doped silica fibers tens of meters in length showed that actual power absorption was better than that predicted by the ideal model. This led to the discovery that the saturation effect discussed above can be overcome by perturbing the higher order modes thereby "mode coupling" them into lower order modes that are partially absorbed in the fiber core. Such processes can be intrinsic to the glass composition or extrinsic. Intrinsic processes include light scattering processes induced by the glass arising from random perturbation in the index as discussed for instance by Garito et al, Science 281, 962 (1998), which are often insufficient to generate substantial mode coupling. Extrinsic effects include bending of the fiber as proposed in U.S. Pat. No. 4,815,079, D-shaped fibers, or fibers with an eccentric core as described in U.S. Pat. Nos. 3,729,690 and 4,815,079. Extrinsic effects are difficult to control, quite sensitive to fiber management or packaging and expensive. But as shown in FIG. 2, these extrinsic length effects can produce enough mode coupling to substantially increase the power absorption efficiency η 12 for αL>20 if the fiber is sufficiently long, in excess of several tens of meters. In fibers this long, the dopant levels must be low, e.g. <0.1 wt % erbium, to ensure inversion over the entire fiber length.

Amplifiers that use multi-component glass fibers have been limited to single-mode core pumped configurations (see T. Nishi et al., "The amplification properties of a highly $Er^{+3}$ doped phosphate fiber," Jpn. J. Appl. Phys., Vol. 31 (1992), Pt. 2, 2B, pp. L177–L179 reaches moderate, up to 1.53 wt. %, erbium doping). As discussed, multi-mode pumping requires enhanced absorption to field commercially viable amplifiers. The propagation loss in the cladding in multi-component glass, generally non-silica fibers, is too high to use long fiber lengths and take advantage of these known mode coupling effects. Thus, to get sufficient pump power into the fiber core amplifiers have used the more expensive single-mode pumps.

SUMMARY OF THE INVENTION

In view of the above problems, the present invention provides a compact, low-cost mid-gain Erbium Micro-Fiber Amplifier (EMFA).

This is accomplished by multi-mode pumping a micro fiber formed from a specialty multi-component glass and highly co-doped with 0.5 to 5 wt. % erbium and 5 to 30 wt. % ytterbium. The specialty glass exhibits a much higher core absorption coefficient α than standard glasses. As a result, the lower order modes are rapidly absorbed in the fiber core. The abrupt change in the mode profile perturbs the higher order modes and mode couples them into the lower order modes within a very short length of fiber, <20 cm. This "absorptive mode coupling" effect can double the absorption efficiency of a circular symmetric micro fiber and extend the length over which such a highly doped fiber can be efficiently inverted. The combination of multi-mode pumping with short fiber lengths reduces the form factor and cost of EMFAs and facilitates integration with other optical components.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a through 3e are simplified schematics of single and double pass multi-mode clad-pumped EMFAs in accordance with the present invention;

DETAILED DESCRIPTION OF THE INVENTION

Figure 1:
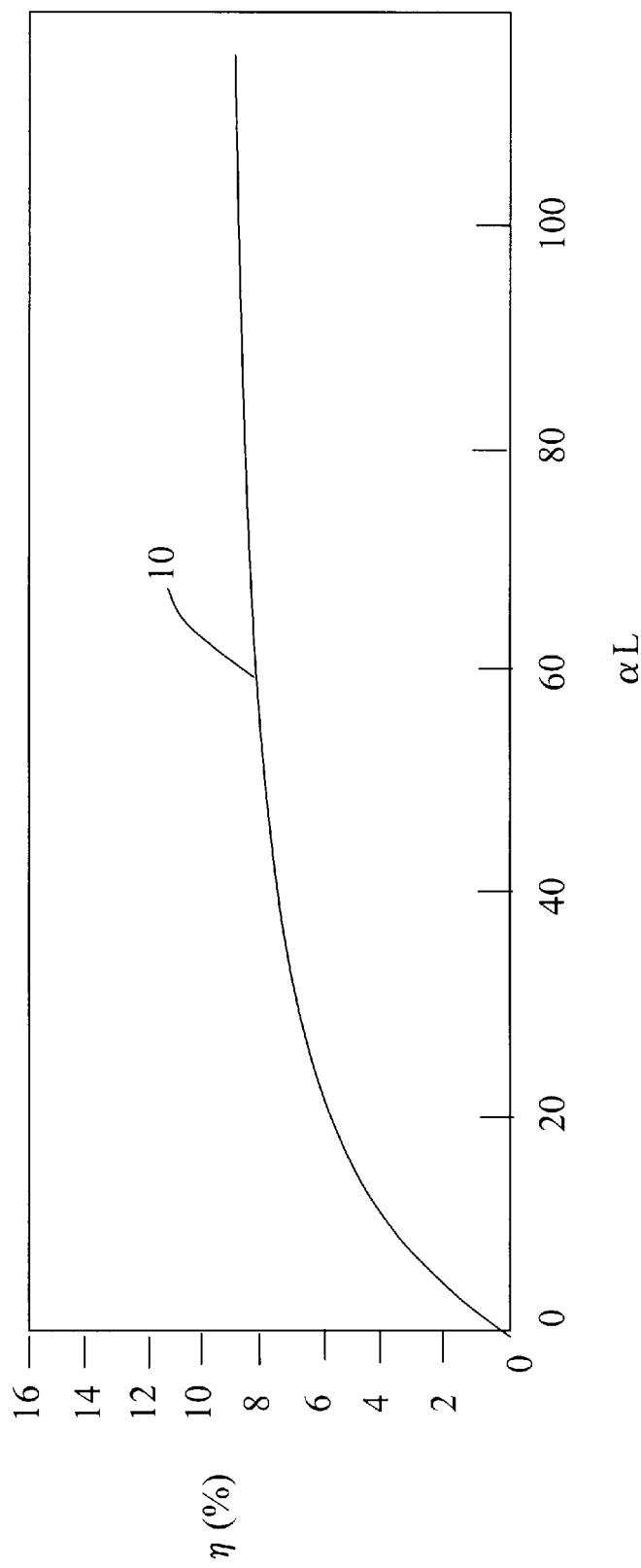
FIG. 1, as described above, is a plot of η vs. αL showing saturation effect.
Figure 2:
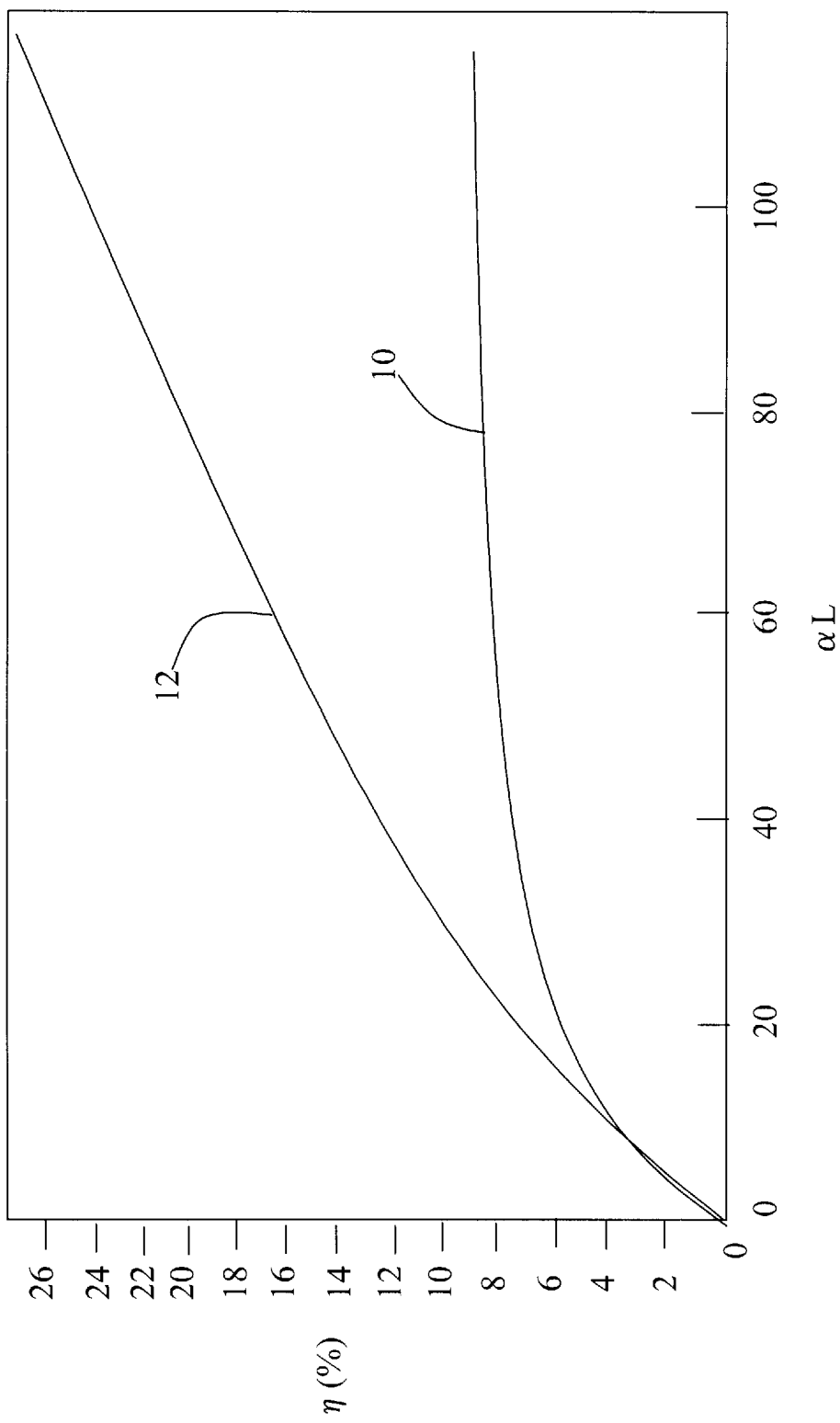
FIG. 2, as described above, is a plot of η vs. αL curve showing mode-coupling length effects that increase absorption efficiency.

The present invention provides a compact low cost erbium micro fiber amplifier (EMFA) for use in metro and other applications. The EMFA uses a multi-mode pump to clad-pump a multi-component glass micro fiber that is heavily doped with erbium (0.5–5 wt. %) and ytterbium (5–30 wt. %). The micro fiber is suitably circularly symmetric and less than 20 cm in length, typically 2–10 cm.

Early testing of the EMFA of the present invention produced power absorption efficiencies measurably higher than were predicted by geometric optics modeling for a short circularly symmetric highly doped fiber with no intrinsic or extrinsic mode coupling effects. Intensive investigation revealed a new "absorptive" mode coupling effect attributable to the elevated absorption coefficient of the highly doped multi-component glass, e.g. α>5 $cm^{-1}$ at the peak wavelength. Ytterbium concentrations of 5 wt. % or higher cause a rapid absorption of the low order modes, which in turn perturbs the higher order modes and mode-couples them into the core. In short fibers where extrinsic effects do not have sufficient length to accumulate, absorptive mode coupling is the leading order effect, potentially doubling the absorption efficiency η and increasing the length over which such fibers can be inverted. Absorptive mode coupling does exist in standard light and moderately doped fibers. However, the effect is so small due to the low absorption coefficient relative to other extrinsic mode coupling effects in conventional EDFAs employing meters of spooled fiber as to have gone undetected both in the BPM modeling (Kouznetsov et al., J. Opt. Soc. Am. B 18, 743 (2001), and Doya et al. Opt. Lett. 26, 872 (2001)) and empirical data.

A model, termed Effective BPM, for EMFA performance has been developed and validated against empirical data. The model is based on the beam propagation method (BPM), which is a standard model for describing wave propagation in integrated optical structures. In contrast to the EDFA models that employ fixed pump and signal beam profiles, BPM reflects the changes in the mode profile caused by the elevated absorption coefficient and thereby incorporates the absorptive mode coupling effect. In addition, the standard BPM model was modified to account for saturation of the absorption coefficient and nonlinear effects that become appreciable at high dopant concentrations.

Erbium Micro Fiber Amplifier (EMFA)

A compact EMFA 14 is, in general, formed by replacing the meters of coiled silica fiber in a typical EDFA with a micro fiber 16 less than 20 cm in length, typically 2–10 cm, formed of a multi-component glass co-doped with 0.5–5 wt. % erbium and 5–30 wt. % ytterbium and replacing the single-mode pump with an inexpensive multi-mode pump 18. Multi-mode pump lasers output multiple spatial modes from either a single broad emitting area or an array of single transverse mode lasers. In both cases, different modes have different phase and propagation directions, which makes focusing more difficult than with single mode lasers. Single and double-pass EMFAs are depicted in FIGS. 3a through 3e with different pump coupling configurations. Other passive components such as taps, detectors and gain flattening filters are not shown.

As shown in FIG. 3a, single-pass EMFA 14 includes a micro fiber 16 that is fusion spliced at splices 20 and 22 between sections of passive double-clad fiber 24 and 26, respectively. Multi-mode pump 18, in a hermetically sealed package, directs pump light into a TIR coupler 27, which couples the light into the fiber's inner cladding 28 where it is confined by an outer cladding 30, air or some other lower index material as shown in a exploded section view of the micro fiber. As the multi-mode pump propagates down the fiber, the pump light is coupled into and partially absorbed in core 32 thereby pumping the active material in the fiber core and amplifying optical signal 34 passing therethrough. A variety of pump coupling and recycling schemes can be adopted to optimize gain, noise figure, form factor, power consumption or cost. For example, a grating may be written on or a prism mounted on the inner cladding of double-clad fiber 26 to reflect and further mode couple the pump radiation.

FIG. 3b illustrates a free-space single-pass EMFA 14, in which micro fiber 16 and multi-mode pump 18 (chip-on-submount) are arranged in an inline extended butterfly hermetic package 36. Optical signal 34 is brought in from a conventional single-mode fiber (SMF) 35 via fiber port 38 and a coupling optic 40, which collimates the signal beam. Pump coupler 42 free-space couples the optical signal and pump into the fiber core and fiber cladding, respectively. The pump is coupled into the fiber core where it inverts the active material such that the optical signal is amplified as it propagates therethrough. The amplified signal is output coupled via coupling optic 44 through fiber port 46 to a conventional SMF 48. One advantage of the free-space approach is that the passive components can be discrete and simply dropped into the signal path.

As shown in FIG. 3c, a double-pass EMFA 14 includes an optical circulator 49 and a reflector 50 (broadband or wavelength selective) that are placed at each end of micro fiber 16 to give double-pass amplification to input optical signals 34. As depicted in this particular embodiment, micro fiber 16 is fusion spliced at splices 51 and 52 between sections of passive double-clad fiber 53 and 54. A gain flattening filter 55 is written on double clad fiber 54 to flatten the gain spectra. Optical circulator 49 has an input port 56 for receiving input optical signal 34, an I/O port 57 for coupling signal 34 to and from micro fiber 16, and an output port 58 for producing the amplified optical signal 59. Multi-mode pump 18 couples pump light into the fiber's inner cladding via a fused fiber coupler 60 or, as described below, a TIR coupler where the pump is confined by an outer cladding, air or some other lower index material. As it propagates down the fiber, the pump is coupled into and partially absorbed in the fiber core thereby pumping the active material in the fiber core and amplifying the optical signal. A variety of pump coupling and recycling schemes can be adopted to optimize gain, noise figure, form factor, power consumption or cost. For example, broadband reflector 50 can be formed at an angle or with a curvature to further enhance mode coupling of the reflected pump.

As shown in FIG. 3d, the double-pass EMFA 14 is configured such that the multi-mode pump is coupled into the open-end of the amplifier. Broadband reflector 50 is replaced by a wavelength selective filter 62 such as a grating written on SMF that reflects light at the signal wavelength but transmits light at the pump wavelength. Multi-mode pump 18 directs pump light into the cladding of the SMF fiber. The pump light propagates through GFF 55 and inverts micro fiber 16 thereby providing amplification for optical signal 34. To reduce noise figure to an acceptable level the pump must be recycled. Pump recycler 64 such as a surface coated with a wavelength selective material at or near the I/O port 57 of the circulator or a grating written into the inner cladding of SMF 53 will serve to reflect the pump and pass amplified signal 59.

Efficient coupling of the multi-mode pump into the inner cladding of the fiber is the first step in obtaining high overall pump absorption efficiencies. Fused fiber couplers are ne approach that yields coupling efficiencies of approximately 50%. As described in co-pending U.S. patent application Ser. No. 09/943,257 entitled "Total Internal Reflection (TIR) Coupler and Method for Side-Coupling Pump Light into a Fiber", which is hereby incorporated by reference, coupling efficiencies approaching 90% are achieved by bonding a TIR coupler (element 27 in FIG. 3a above) in optical contact with the fiber's inner cladding; either the micro fiber itself or the passive double-clad fiber. The TIR coupler has an angle of taper and a length such the principal ray of the pump light is reflected at an angle that satisfies the total internal reflection condition at the coupler's reflecting surface, and input and output coupling conditions, to efficiently "fold" the light into the fiber and satisfies the TIR condition inside the fiber to "guide" the light down the fiber's inner cladding. The angle of incidence is preferably such that substantially all of the pump light (principal and marginal rays) satisfies the TIR condition.

Figure 3E:
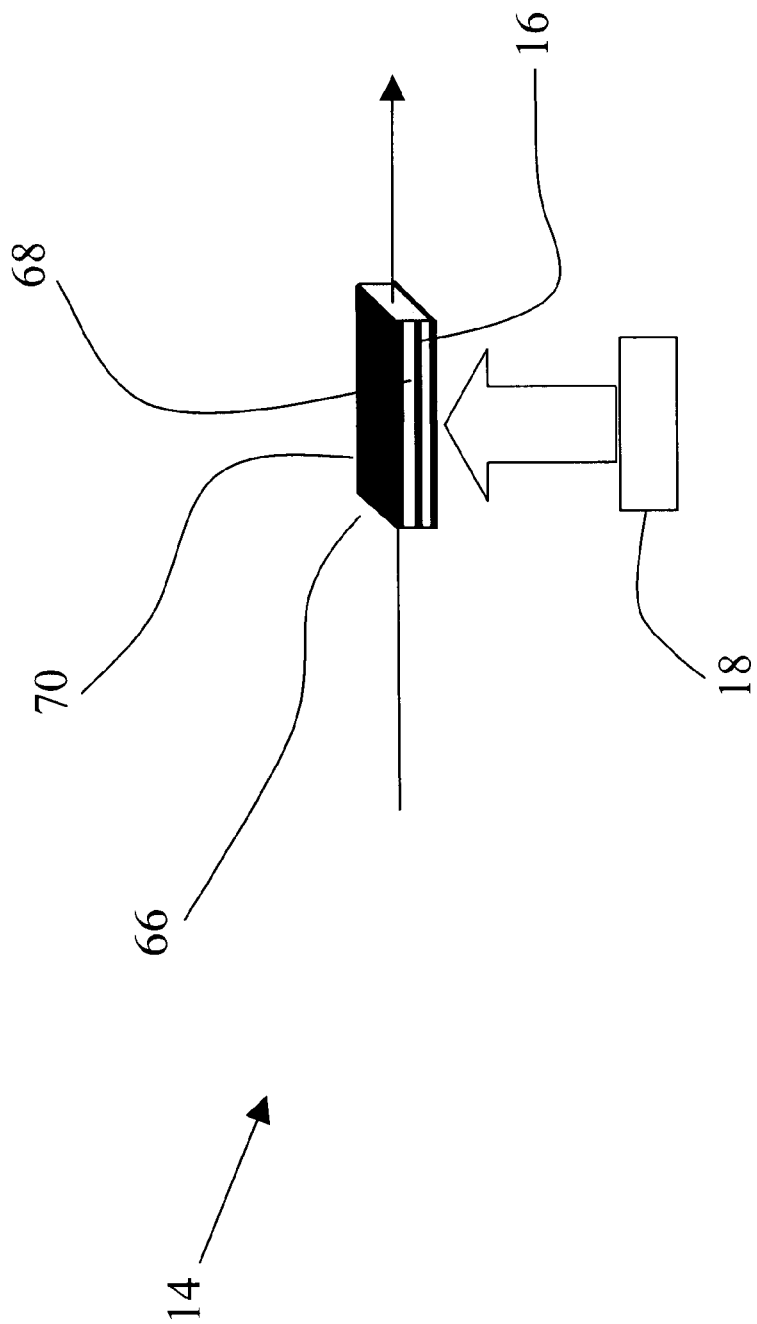

FIG. 3e illustrates a side-pumped EMFA 14 (single or double pass) comprising a planar waveguide 66 that includes one or more micro fibers 16 embedded in an inner cladding layer 68 surrounded by a pair of outer cladding layers 70 (air or a compatible material with a lower index). A multi-mode pump 18 injects light into the inner cladding layer 66, which is substantially transparent to the pump wavelength, so that the pump light moves in a transverse direction with respect to the longitudinal orientation of the micro fiber(s). The inner cladding layer serves both to confine the optical signal inside the micro fiber and to guide the pump light. The sides of the inner cladding layer are reflective to the pump wavelength so that the pump light is recycled and illuminates multiple segments of the micro fiber(s) as the pump light bounces back-and-forth and moves longitudinally down the waveguide producing a uniform pump intensity. Double-pass amplification is achieved by coating the end of waveguide 62 with a reflective material. The illumination of the micro fiber causes stimulated emission, hence amplifying the optical signals passing through the micro fiber(s).

Er:Yb Multi-Component Glass

To achieve high-gain in ultra-short lengths, e.g. 2–20 cm, the glass host must support very high Er doping concentrations to realize the necessary gain, support very high Yb doping concentration to efficiently absorb pump light in an ultra-short cavity, and transfer energy efficiently from the absorbed ytterbium to the erbium. Compared to either silica or phosphosilicate, a multi-component glass host improves the solubility to erbium and ytterbium ions thereby allowing higher dopant levels without raising the upconversion rate and increases the phonon energy thereby reducing the lifetime of ions in the upper energy state which has the effect of improving energy transfer efficiency. Multi-component glasses support doping concentrations of the rare-earth ions erbium and ytterbium far in excess of levels possible with conventional glasses or previously demonstrated in single-mode pumped phosphate glass amplifiers. The nonradiative transition between level $I_{11/2}$ to the level $I_{13/2}$ is very fast due to the higher phonon energy compared with silica glass. Fast transfer from the level $I_{11/2}$ to the level $I_{13/2}$ prevents back transfer. As a result, codoping with ytterbium has a significant effect on the absorption of multicomponent glass fiber.

In general, multi-component glasses have a glass composition that contains one or more glass network formers ($P_2O_5$ phosphate, $SiO_2$ silicate, $GeO_2$ germanate, $TeO_2$ tellurite, $B_2O_3$ borate), one or more glass network modifiers MO (alkaline-earth oxides and transition metal oxides such as BaO, BeO, MgO, SrO, CaO, ZnO, PbO and mixtures thereof), and one or more glass network intermediators XO (PbO, ZnO, $WO_3$, $Y_2O_3$, $La_2O_3$, $Al_2O_3$, $B_2O_3$ and mixtures thereof). The glass network formers are selected because their glass networks are characterized by a substantial amount of non-bridging oxygen that offers a great number of dopant sites for rare-earth ions. The modifier modifies the glass network, thereby reducing its melting temperature and creating additional dopant sites. The intermediator bridges some of the bonds in the network thereby increasing the network's strength and chemical durability without raising the melting temperature appreciably. The multi-component glasses of interest thus have a much lower softening temperature than silica ($SiO_2$), which greatly simplifies processing. The fiber core is then co-doped with high concentrations of rare-earth dopants erbium and ytterbium. The cladding layer(s) are typically undoped glass. Multi-component glass fibers exhibit a propagation loss greater than 0.005 dB/cm.

The present invention utilizes a subclass of multi-component glasses that comprises a network former selected from ($P_2O_5$ phosphate, $GeO_2$ germanate or $TeO_2$ tellurite) of 30 to 80 weight percent; a network modifier MO of 2 to 40 weight percent (alkaline-earth oxides and transition metal oxides such as BaO, BeO, MgO, SrO, CaO, ZnO, PbO and mixtures thereof) a network intermediator XO of 2 to 30 weight percent (PbO, ZnO, $WO_3$, $Y_2O_3$, $La_2O_3$, $Al_2O_3$, $B_2O_3$ and mixtures thereof); and co-doped with Erbium 0.5 to 5 weight percent, preferably 2 wt. % or greater, and Ytterbium 5 to 30 weight percent, with a total doping concentration preferably greater than 10 weight percent. In an alternate embodiment the glass is co-doped with Erbium 2 to 5 weight percent and Ytterbium 12 to 30 weight percent, with a total doping concentration preferably greater than 15 weight percent.

In a preferred embodiment, the glass composition is designed so that the temperature coefficient of refractive index (dn/dT) is approximately zero, e.g. suitably from $-2.0 \times 10^{-6}$ to $+2.0 \times 10^{-6}$ $K^{-1}$ and preferably $-1.0 \times 10^{-6}$ to $+1.0 \times 10^{-6}$ $K^{-1}$. It is important the refractive index of the glass remain stable over temperature to maintain amplifier performance. One approach to achieving dn/dT $\approx 0$ is to provide a glass composition that is "alkaline-free" or lightly alkaline (network modifiers $R_2O$ selected from alkaline metal oxides such as $K_2O$, $Na_2O$, $Li_2O$, and $Rb_2O$ up to 5 wt. %). Alkaline free glasses will typically exhibit a small but often non-negligible dn/dT. To ensure dn/dT is close to zero, the glass composition may further include a mixture of network modifiers such as BaO and/or ZnO. Mixtures of BaO and ZnO of up to 25.5 wt. % each have been demonstrated to produce the desired index. As an additional benefit, alkaline-free or lightly alkaline glass has demonstrated improved mechanical and chemical durability. Glass compositions with higher levels of alkaline can be designed to exhibit acceptable dn/dT but they are not preferred.

Figure 4:
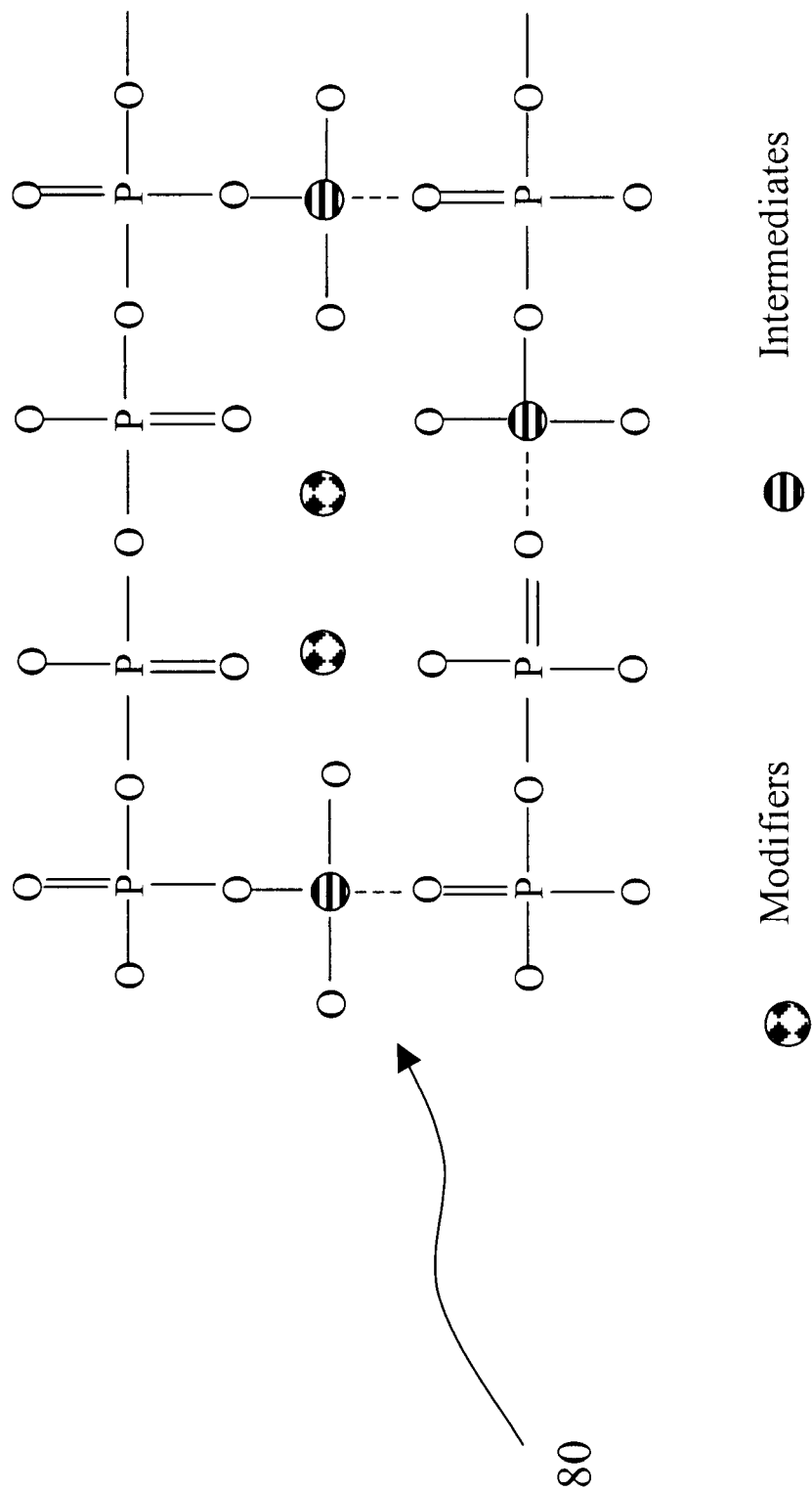
FIG. 4 is a glass network diagram for phosphate glasses.

As shown in FIG. 4, the low temperature multi-component glasses as represented by phosphate glass 80 have a different bond structure than silica glass. In phosphate glass the basic unit of structure is the $PO_4$ tetrahedron. Because phosphate (P) is a pentavalent ion, one oxygen from each tetrahedron remains non-bridging to satisfy charge neutrality of the tetrahedron. Therefore, the connections of $PO_4$ tetrahedrons are made only at three corners. In this respect, phosphate glass differs from silica-based glasses. Due to the large amount of the non-bridging oxygen, the softening temperature of phosphate glasses is typically lower than silicate glasses. At the same time, the large amount of non-bridging oxygen in phosphate glass offers a great number of sites for rare-earth ions, which results in a high solubility of rare-earth ions. The modifier modifies the glass network, thereby reducing its melting temperature and creating even more sites for rare-earth ions. A uniform distribution of rare-earth ions in the glass is critical to obtain a high gain per unit length. The intermediator bridges some of the bonds in the network thereby increasing the network's strength and chemical durability without raising the melting temperature appreciably.

In one specific embodiment, a phosphate gain fiber for multi-mode clad-pumping comprises:
a cladding that includes
    66.63% by weight $P_2O_5$,
    6.46% by weight $Al_2O_3$,
    23.42% by weight BaO,
    2.59% by weight $B_2O_3$, and
    0.9% by weight MgO and
a core that includes
    55.21% by weight $P_2O_5$,
    5.36% by weight $Al_2O_3$,
    22.2% by weight BaO,
    0.99% by weight ZnO,
    3% by weight $Er_2O_3$, and
    15% by weight $Yb_2O_3$.

Absorptive Mode Coupling

The co-doped multi-component glasses exhibit a much higher core absorption coefficient α than standard glasses, at least 5 $cm^{-1}$ at the peak wavelength. The fundamental mode and other lower order modes substantially overlap the fiber core while the higher order modes substantially overlap the inner cladding at z=0. The fundamental mode is rapidly absorbed in the micro fiber core (z≈2 cm) while the higher order modes remain substantially unchanged. The abrupt change in the mode profile perturbs the higher order modes and partially mode couples them into the lower order modes within a very short length of fiber, less than 20 cm and typically less than 10 cm.

Figure 5A:
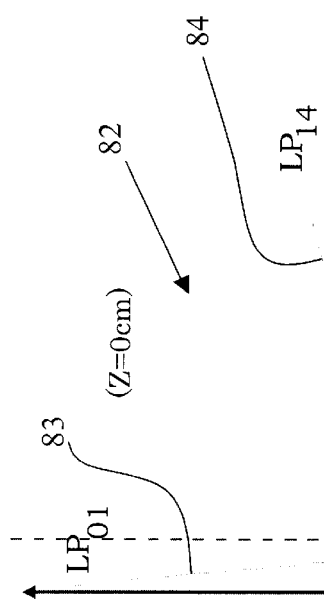
FIGS. 5a through 5c illustrate the mode profile of the micro fiber showing rapid absorption of fundamental modes and the absorptive mode coupling effect in a heavily doped micro fiber.
Figure 5B:
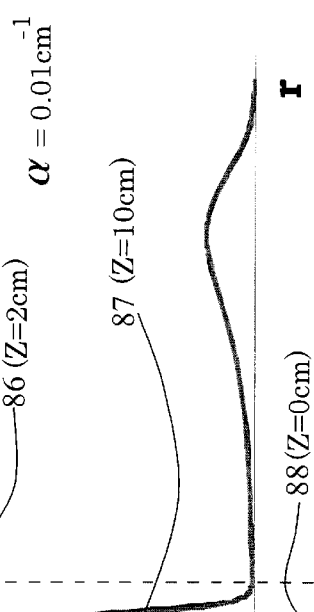
Figure 5C:
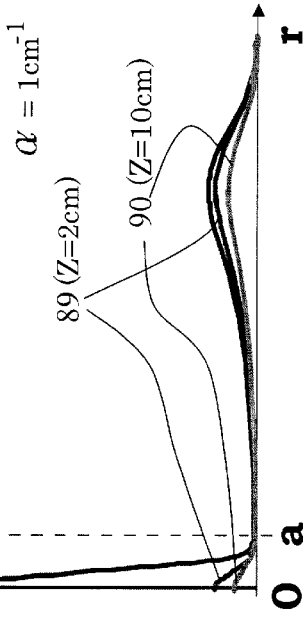

This absorptive mode coupling effect is illustrated in FIGS. 5a through 5c, which plot the mode profile 82; mode energy versus radius. As shown in FIG. 5a, the fundamental mode 83 ($LP_{01}$) has a narrow high-energy peak that overlaps with the core and a representative higher order mode 84 ($LP_{14}$) has a broad low energy peak that overlaps the cladding. The effect of propagation on the mode profile is illustrated for two different values of absorption coefficient, one low 0.01 cm$^{-1}$ (FIG. 5b) and one relatively high 1 cm$^{-1}$ (FIG. 5c). As shown in FIG. 5b, the mode profiles 85, 86, and 87 at z=0, 2 and 10 cm, respectively, for an L=10 cm fiber are virtually identical. The low absorption coefficient has caused only minimal absorption and no measurable mode coupling. Conversely, as shown in FIG. 5c, the mode profiles 88, 89, and 90 at 0, 2 and 10 cm, show substantial absorption of the low order modes in the first couple centimeters and mode coupling from the $LP_{14}$ mode to the $LP_{01}$ mode over the remaining length of the fiber. The mode coupling effect is even more dramatic for absorption coefficients greater than 5 cm$^{-1}$.

Figure 6:
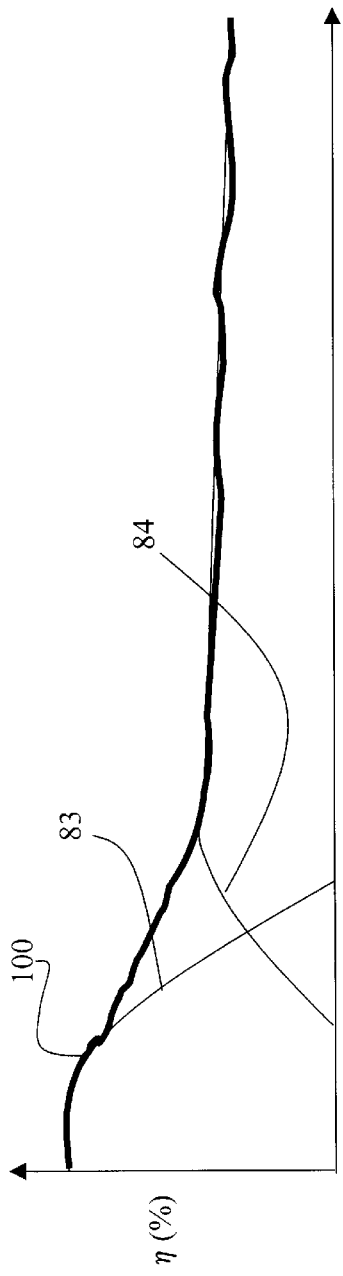
FIG. 6 is a plot of η vs. z showing contributions of both lower and higher order modes to the power absorbed into the fiber core.

FIG. 6 is a simplified plot 100 of η vs. z showing the contributions of both the lower and higher order modes. Lower order modes 83 are rapidly and almost completely absorbed in the fiber core within a few centimeters. As the lower order modes are being fully depleted, the higher order modes 84 are partially mode coupled into the lower modes and absorbed over the remaining length of the fiber. This figure shows not only how the higher order modes increase overall absorption efficiency but also how absorptive mode coupling extends the length of fiber that is inverted. Without this effect such highly doped micro fibers would be limited to only very short lengths, 1–2 cm, and thus would have limited gain performance.

Figure 7:
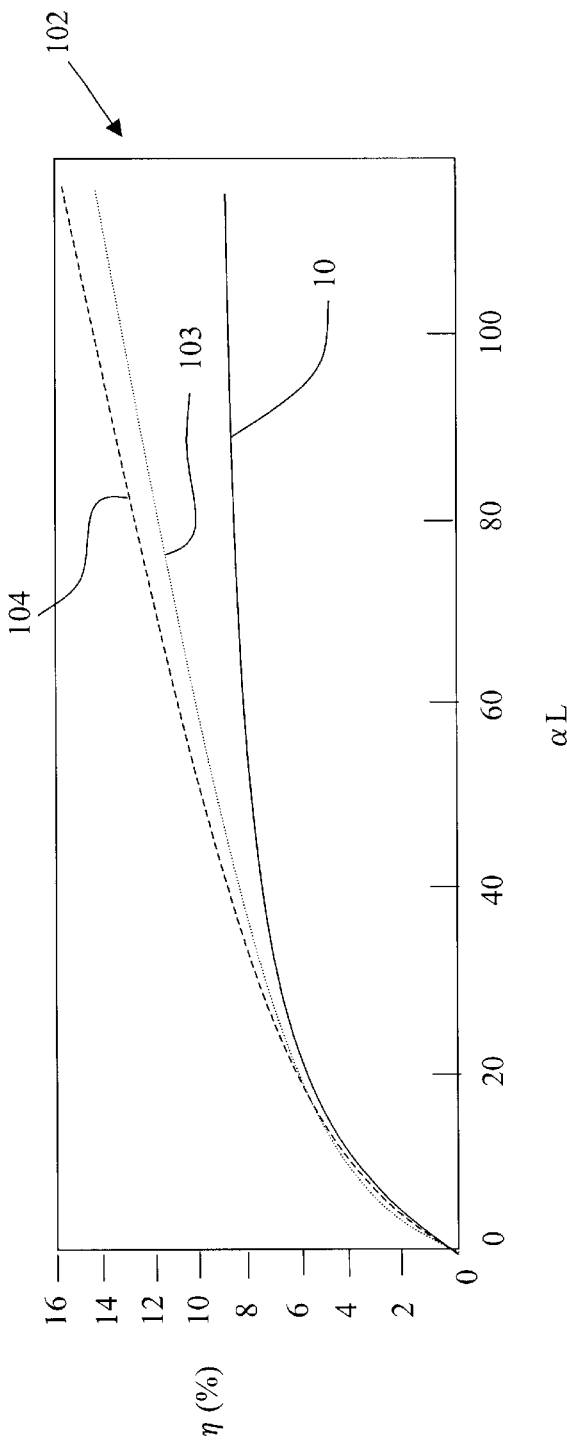
FIG. 7 is a plot of η vs. αL showing absorptive-mode coupling effects that increase absorption efficiency.

FIG. 7 is a plot of η vs. αL illustrating the theoretical effect of absorptive mode coupling on η above the saturation point αL=20. The plot was generated using the Beam Propagation Method (BPM) performed on a number of micro fibers using a model that incorporates the absorptive mode coupling effect for a wavelength of 975 nm, r=3 μm, R=48 μm, and a top hat input field with phase and amplitude fluctuations. The dashed (dotted) lines 102 and 104 show the percentage of the input pump power absorbed in the core from the BPM versus scaled distance αz for α=17 cm$^{-1}$ (α=5 cm$^{-1}$), and the solid line 10 shows the result for ideal circular fibers using the conventional (saturated) model.

As depicted, the absorption efficiency η does not saturate but continues to increase linearly with αL albeit at a slightly more gradual slope. Since the absorptive mode coupling effect is plotted against a normalized propagation distance 60 L, the effect exists for both short highly doped fibers and long lightly doped fibers. However, in traditional silica EDFAs where extrinsic length effects are employed, those effects will be the dominant second order effect and absorptive mode coupling will constitute a negligible third order effect. But in micro fiber amplifiers where extrinsic length effects are not available to improve absorption efficiency, absorptive mode coupling is both necessary and sufficient to achieve the performance requirements for metro amplifiers.

Assuming for now that the absorption coefficient of the core is a constant, the underlying model for FIG. 7 includes basic equations for the power in the coupled modes $P_{core}$ and the non-coupled modes $P_{clad}$ of:

$$\frac{dP_{core}}{dz} = -\alpha P_{core} + \kappa\alpha(P_{clad} - P_{core}) \quad (1)$$

$$\frac{dP_{clad}}{dz} = -\alpha_{scatt}P_{clad} - \kappa\alpha(P_{clad} - P_{core}) \quad (2)$$

where α is the absorption coefficient of the core, $\alpha_{scatt}$ is the residual absorption of the non-coupled cladding modes due to scattering etc, and κα is the spatial rate at which power is converted back and forth between the core (low) and cladding (high) modes due to intermodal coupling via the absorptive core. The explicit factor α is included because the power transfer rate is expected to vary with core absorption. Thus, κ is a dimensionless quantity, which should depend only on the fiber refractive-index profile. These equations should apply for distances beyond which the initial power ηP$_{in}$ excited into the coupled modes has been absorbed. The parameter κ will be extracted from BPM simulations. For the simulations presented, a wavelength of 975 mn, α=5,17 cm$^{-1}$, and $\alpha_{scatt}$=0 was chosen.

Under the assumption that α>>$\alpha_{scatt}$, κα, there is little depletion of the pump beam $P_{clad}$>>$P_{core}$ so $dP_{core}/dz \approx 0$, giving:

$$P_{core}(Z) = \kappa P_{in} e^{-\alpha_{eff}z} \quad (3)$$

where $$\alpha_{eff} = \alpha_{scatt} + \kappa\alpha \quad (4)$$

is the effective pump absorption coefficient, which is extracted from the BPM. For the absorption coefficients α=5,17 cm$^{-1}$, and $\alpha_{scatt}$=0, $\alpha_{eff}$=0.004, 0.013 cm$^{-1}$, giving κ=7.6×10$^{-4}$ for the fiber under consideration. Equation (3) describes power that is replenished into the core by mode coupling from the non-coupled cladding modes after the power initially coupled into the core has been absorbed. The replenished power decays on a length scale $1/\alpha_{eff}$, typically hundreds of centimeters for micro fibers.

The power replenished into the core also acts to increase the fraction f of the input power deposited in the core according to:

$$f(z) \approx \text{const.} + \alpha_{eff}z \quad (5)$$

Thus for a 1% change in absorbed fraction a length L≈0.01/$\alpha_{eff}$, or about 1 cm is required for a specialty micro fiber. For a conventional fiber with α=0.1 cm$^{-1}$ 1 m is required for a 1% change in the absorbed fraction. Typically, other effects such as deviations from circular symmetry dominate over absorptive coupling in conventional fibers.

Figure 8:
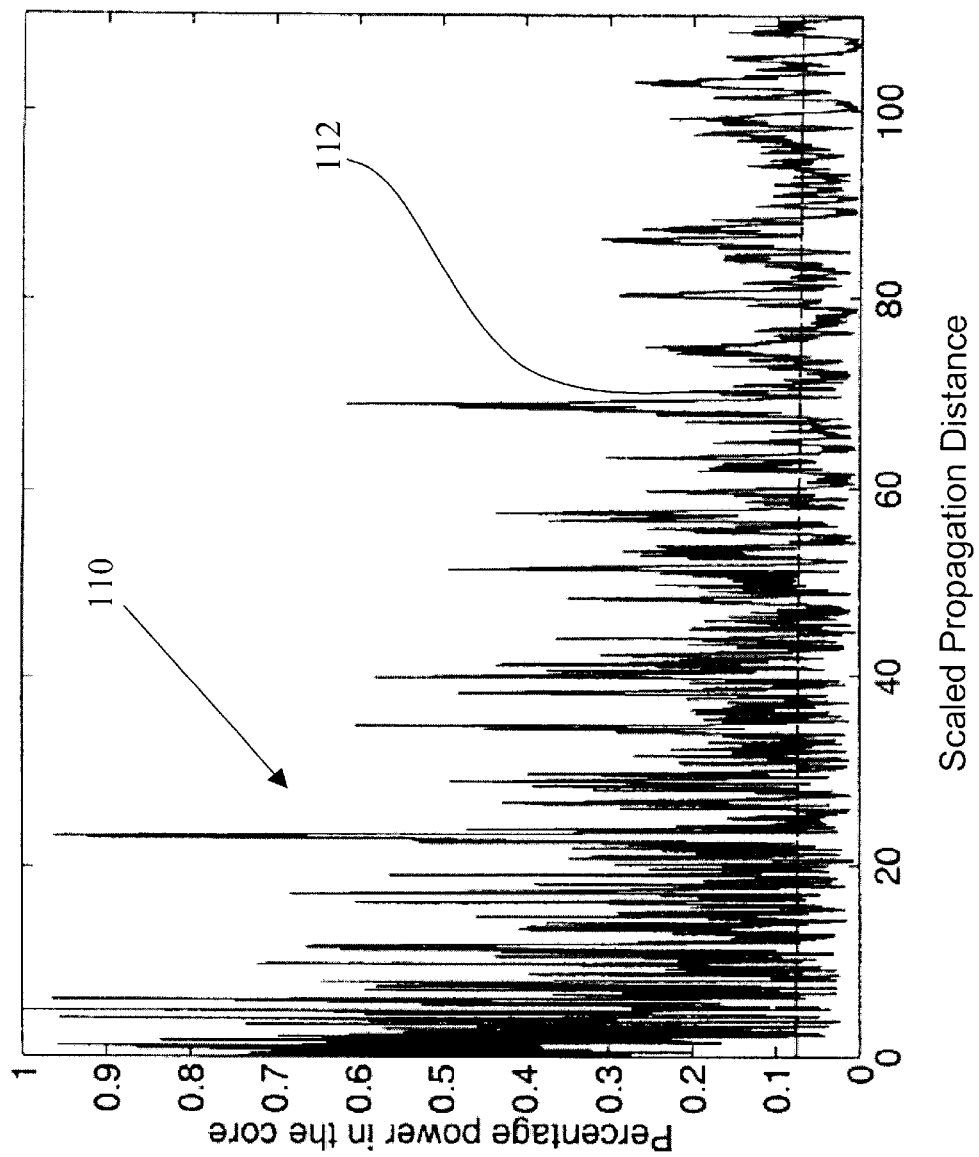
FIG. 8 is a plot of the percentage of the input pump power in the core as a function of scaled propagation distance αz.

FIG. 8 shows the percentage of the input pump power 110 in the core as a function of scaled propagation distance αz, and the dashed line 112 corresponds to the analytic approximation in Eq. (3). For this simulation α=17 cm$^{-1}$ and from the BPM simulation $\alpha_{eff}$=0.013 cm$^{-1}$. The analytic approximation captures the averaged features of pump absorption for distances beyond which the initial power in the core has been absorbed. In particular, for αz>20 the power being deposited in the core is mainly due to replenishment by mode coupling from the cladding mode power.

Effective Beam Propagation Method (BPM)

Neither the standard rate and power equation model used to model single-mode pumped amplifiers or the standard BPM used to describe wave propagation in optical fibers provides an accurate model for the EMFA. Although the standard BPM reflects the changes in the mode profile caused by the elevated absorption coefficient and thereby incorporates the absorptive mode coupling effect, BPM does not account for the detailed nonlinear saturation behavior of the absorption coefficient, which becomes significant at the highly elevated doping levels of the present invention. Rate and power equation models do accurately describe absorption saturation but do not account for mode coupling. Both models fail to account for higher order nonlinear terms that become significant at the elevated doping concentrations.

Empirical testing showed that both models overstate the gain performance of an EMFA.

Rate and Power Equation Models

The standard rate and power equation models were initially developed for single mode pumping where the pump and signal modes are characterized by well defined distributions of the corresponding fields $\Psi_{P,S}(x,y)$ in the transverse plane (x,y) perpendicular to the axis z along the fiber (also called the transverse shape of the mode). Then, for example, the single-mode equation for the evolution of the signal power $P_S$ takes the form:

$$\frac{dP_S(v_S, z)}{dz} = \left\{ \int_{core} [\sigma_{21}(v_S)N_2(r, z) - \sigma_{12}(v_S)N_1(r, z)]\Psi_S(r)r dr d\varphi - \alpha_S \right\} P_S(v_S, z) \quad (6)$$

$$= g[N_i(P_P(z), P_S(z)]P_S(v_S, z)$$

where g is the optical gain experienced by the signal, which depends parametrically on both the signal and pump powers. The other parameters symbols are defined below.

The differences in transverse shapes of the pump and signal modes as well as their mismatch with the transverse distribution of Yb and Er ions in the core are in general parameterized by factors known as overlap factors, which can be considered as geometric corrections factors. In these models using overlap factors, the entire mode will experience gain or loss but will conserve its transverse profile. The model is then reduced to a one-dimensional problem where the various pump and signal modes are propagating along the fiber axis z. Gain along the fiber can be modeled by solving simultaneously the rate equations for all the populations of the energy levels of Er and Yb that participate in the amplification process, and the equations that give the distribution of signal and pump power along the fiber.

Let us consider the absorption mechanism in co-doped Yb/Er system. Pump photons around 975 nm are first absorbed by the $F_{7/2}$ state exciting it into the $F_{5/2}$ one of $Yb^{3+}$. From there a cooperative energy transfer process between excited state $F_{5/2}$ of $Yb^{3+}$ and the ground state $I_{15/2}$ of $Er^{3+}$ excites the $Er^{3+}$ ion to $I_{11/2}$ state while dropping back $Yb^{3+}$ to its ground state $F_{7/2}$. The process is described by the energy transfer coefficient $K_F$. $Er^{3+}$ ions can also absorb photons around 975 nm, but the absorption efficiency is much lower. In this model, which assumes low dopant concentrations, the absorption coefficient is a function of the populations of $I_{15/2}$, $F_{7/2}$, and $F_{5/2}$ levels (levels (1), (5) and (6) in FIG. 9, respectively as follows:

$$\alpha_{abs} = \sigma_{56}(v_p)N_5(z) - \sigma_{65}(v_p)N_6(z) + \sigma_{13}(v_p)N_1(z) \quad (7)$$

where $\sigma_{13}(v_p)$ is absorption cross section of $Er^{3+}$ ions from the first to the third level, and $\sigma_{56}(v_p)$ and $\sigma_{65}(v_p)$ are absorption and emission cross-sections of $Yb^{3+}$ ions, respectively. The populations $N_i$, which are solutions of a system of rate equations, are in turn functions of the pump and signal powers. This way, the absorption coefficient saturates for high pump powers and is not a constant.

The standard rate and power equations model were modified in the present invention to account for the highly elevated doping concentrations by including certain higher order terms, which are associated with inter-ion interactions and their corresponding upconversion and pair induced quenching effects. Such effects have been mentioned in the literature but never taken into account in simulations of EMFA because they were not needed in low dopant concentration systems. M. Karasek "Optimum Design of $Er^{3+}$–$Yb^{3+}$ codoped fibers for large-signal high-pump-power applications," IEEE J. of Quantum Electronics, 33, 1699–1705 (1997) discussed the use of $K_F$, $C_{22}$, $C_{33}$ and $C_{14}$ in the simulation of Er/Yb single-mode pumping. I. A. Grishin et al, "Up-conversion luminescence in $Er^{3+}$–$Yb^{3+}$–doped fluorozirconate glasses," Optical Fiber Technology 1, 331–334 (1995) presented experimental work on the green light in heavily co-doped Yb/Er fibers. E. Mauice et al, "Clustering effects on double energy transfer in heavily ytterbium-erbium codoped silica fibers" J. Opt. Soc. Amer. B, vol 13, 693–701(1996) discussed about the double-transfer energy ($K_D$-process). R. H. Page et al, "Upconversion-pumped luminescence efficiency of rare-earth doped hosts sensitized with trivalent ytterbium", J. Opt. Soc. Amer. B, vol 15, 996–1008 (1998) discussed $K_D$ and $K_C$-processes and showed that the red and green light is about 1% and 4%, respectively of the absorbed power. G. C. Valley, "Modeling Cladding-Pumping Er/Yb Fiber Amplifiers," Optical Fiber Technology 7, 21–44(2001) discussed different values of $K_F$ and $C_{22}$ and simulated multimode pumping within the rate and power equation model.

Figure 9:
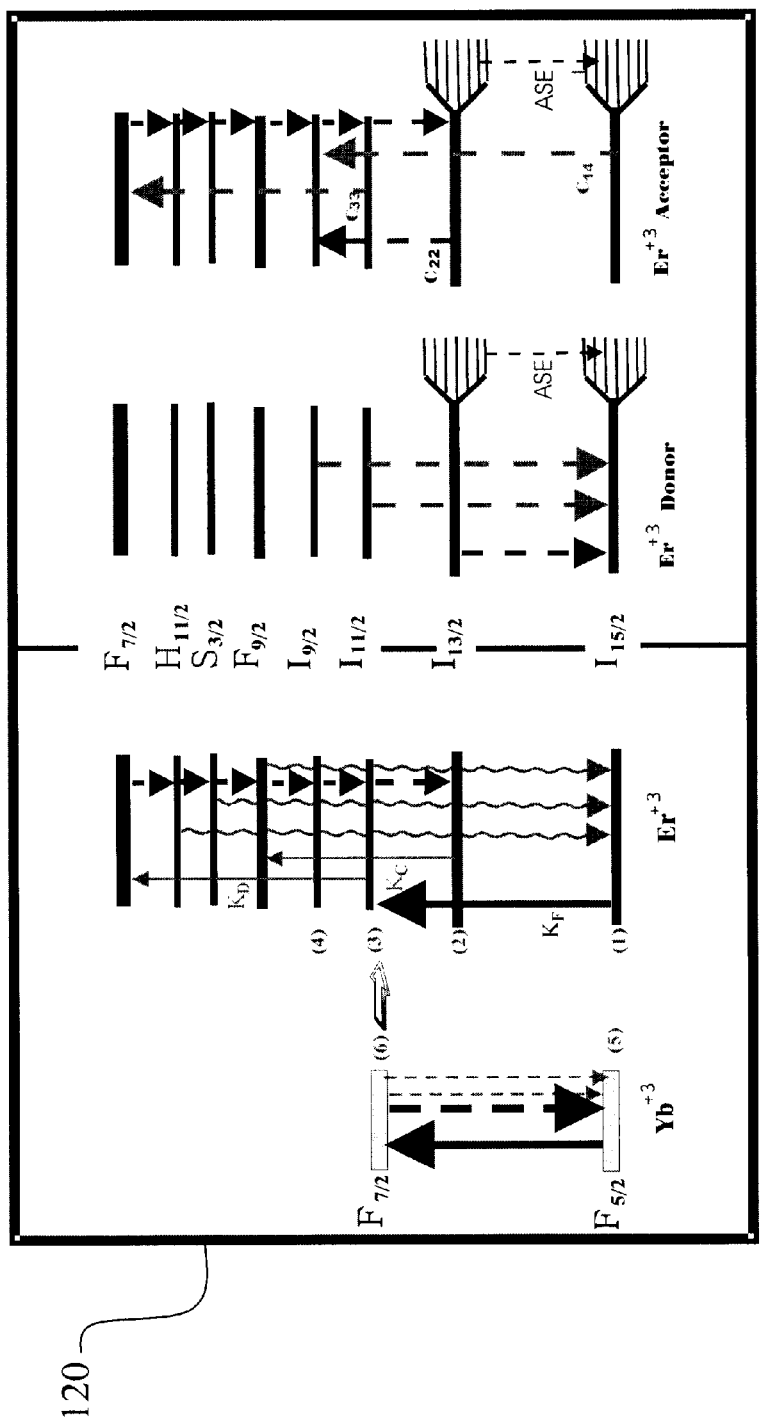
FIG. 9 is a band transition diagram for a Er:Yb micro fiber.

As shown in FIG. 9, the energy diagram 120 for the highly doped micro fiber is more accurately represented by a six level diagram in which two other energy transfer processes from $Yb^{3+}$ to $Er^{3+}$ ions described by $K_D$ (double-energy transfer), and $K_C$ (cumulative transfer) coefficients are also taken into account. The $K_D$ and $K_C$ processes are mainly responsible for the emission of green and red light, respectively, which are always observed experimentally. Note that the green light is visible in highly doped micro fibers. The large phonon energy in phosphate host increases the transition probability for $I_{11/2} \rightarrow I_{13/2}$ relaxation, which prevents the back energy transfer from $Er^{3+}$ to $Yb^{3+}$. The right part of the diagram also illustrates the up-conversion ($C_{22}$, $C_{33}$) and cross-relaxation processes ($C_{14}$) taking place between the two neighboring Er ions. The rate equations of the highly co-doped Yb/Er system can be written as:

$$dN_1/dt = -(W_{12} + W_{13})N_1 + (W_{21} + 1/\tau_{21})N_2 + C_{22}N_2^2 - \quad (8)$$
$$C_{14}N_1N_4 + C_{33}N_3^2 - K_FN_1N_6 + K_CN_2N_6 + K_DN_3N_6$$

$$dN_2/dt = W_{12}N_1 - (W_{21} + 1/\tau_{21})N_2 + \quad (9)$$
$$N_3/\tau_{32} - 2C_{22}N_2^2 + 2C_{14}N_1N_4 - K_CN_2N_6$$

$$dN_3/dt = W_{13}N_1 - N_3/\tau_{32} + \quad (10)$$
$$N_4/\tau_{43} - 2C_{33}N_3^2 + K_FN_1N_6 - K_DN_3N_6$$

$$dN_4/dt = -N_4/\tau_{43} + C_{22}N_2^2 - C_{14}N_1N_4 + C_{33}N_3^2 \quad (11)$$

$$dN_6/dt = W_{56}N_5 - \quad (12)$$
$$(W_{65} + 1/\tau_{65})N_6 - K_FN_1N_6 - K_CN_2N_6 - K_DN_3N_6$$

with $$N_{Er} = N_1 + N_2 + N_3 + N_4 \quad (13)$$

and $$N_{Yb} = N_5 + N_6$$

Where the new $K_C$- and $K_D$-terms have been added to describe the processes mentioned above, and $$W_{12}=\psi_S(r)\sigma_{12}(\nu_S)P_S(z)/h\nu_S \tag{14}$$

$$W_{21}=\psi_S(r)\sigma_{21}(\nu_S)P_S(z)/h\nu_S \tag{15}$$

$$W_{13}=\sigma_{13}(\nu_P)P_P(z)/h\nu_P \tag{16}$$

$$W_{56}=\sigma_{56}(\nu_P)P_P(z)/h\nu_P \tag{17}$$

$$W_{65}=\sigma_{65}(\nu_P)P_P(z)/h\nu_P \tag{18}$$

$$\int \psi_S(r) r dr \, d\phi = 1 \tag{19}$$

Here $\sigma_{12}(\nu_p)$ and $\sigma_{21}(\nu_p)$ are absorption and emission cross sections of $Er^{3+}$ ions from the first $I_{15/2}$ level to the second $I_{13/2}$ level. $P_S(z)$ and $P_P(z)$ are the signal and pump powers, respectively, in the core at distance z.

Figure 10:
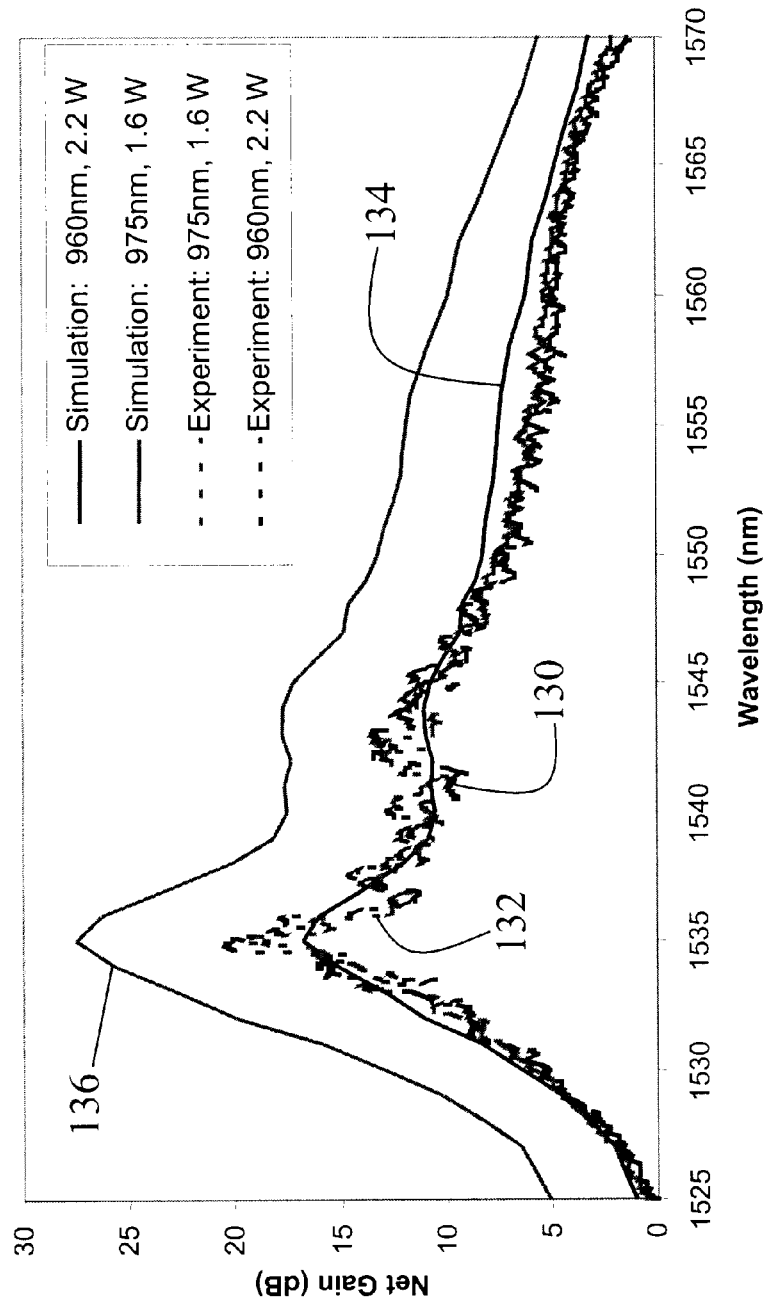
FIG. 10 is a plot of measured and modeled gain curves for the EMFA at 960 nm and 975 nm using a modified rate and power equation model.

Despite the complexity of the modified rate equation model, it still does not provide a good description of the gain properties of EMFA because it ignores the mode coupling that occurs. As shown in FIG. 10, data was measured for an EMFA at 960 nm and 975 nm, data points 130 and 132, respectively. The same data was modeled using the modified rate equation model as shown in curves 134 and 136, respectively. As shown the model and empirical data are in agreement at 960 nm but deviate measurably at 975 nm.

Figure 11:
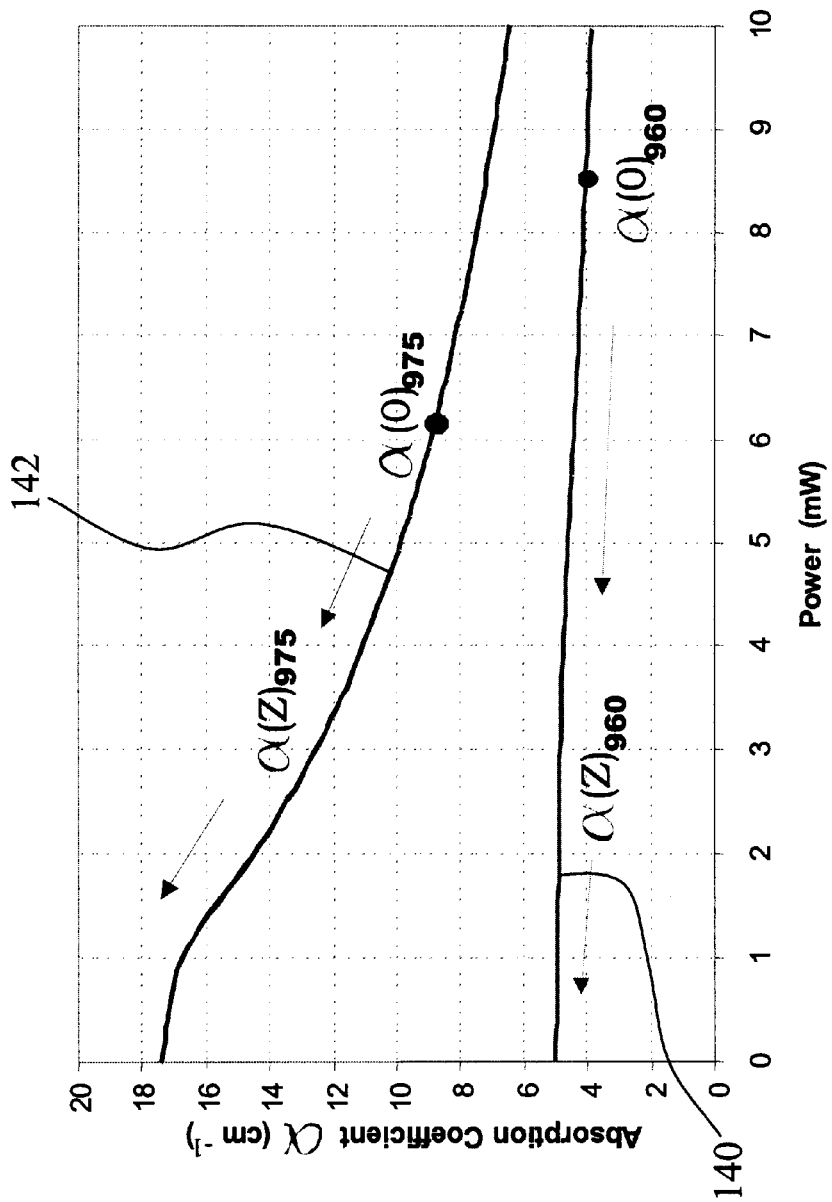
FIG. 11 is a plot of α vs. power deposited into the $core_P$ illustrating saturation absorption in the micro fiber.

This discrepancy can be explained from the saturation absorption curves 140 at 960 nm and 142 at 975 nm in FIG. 11. Consider the absorption coefficient α corresponding to the experimental conditions. The input power deposited into the core under experimental conditions is estimated as $P_{975}(z=0)=\Gamma_P \cdot 1600$ mW≈6.24 mW and $P_{960}(z=0)=\Gamma_P \cdot 2200$ mW≈8.58 mW, and the corresponding absorption coefficient $\alpha_{975}(z=0) \approx 8.6$ cm$^{-1}$ and $\alpha_{960}(z=0) \approx 4$ cm$^{-1}$, respectively. Here, $\Gamma_P$ is the ratio between the core and cladding areas and equals 0.0039 for the fiber under consideration. In this model, when the pump field propagates down to the fiber, the coefficient $\alpha_{960}(z)$ changes gradually from 4 cm$^{-1}$ to 5 cm$^{-1}$, while $\alpha_{975}(z)$ increases rapidly from 8.6 cm$^{-1}$ to 17 cm$^{-1}$, resulting in the fact that the overall absorption efficiency for the pump at 975 nm is higher than that at 960 nm by at least 2 times. As a result, pumping at 975 nm would give a higher gain than the corresponding value at 960 nm by at least a factor of 2. However, as shown in FIG. 10, experimental gain curve pumped at 975 nm with 1.60 W power is almost the same as that pumped at 960 nm with 2.2 W, indicating that the ratio should be around 1.3 in this case.

As mentioned at the beginning of this section, the absorptive mode coupling effect is insignificant if absorption is low. The rate and power equations model does not take into account the mode coupling, and therefore it would be used to model EMFA pumping at low absorption as in the case 960 nm. On the other hand, this model cannot be used to explain the results at 975 nm, where the mode coupling effect is important. hi this case, during the first few centimeters the absorptive mode coupling enhances the deposited power into the core, and therefore, a large amount of pump power is absorbed in the first few centimeters of the fiber. As a result, the amount of power left for the rest of fiber is reduced significantly. Consequently, the model without mode coupling underestimates the absorption efficiency at the first few centimeters but overestimates the efficiency for the rest of the fiber. If the fiber is long enough, the efficiency would be higher than that calculated by the model that takes into account the absorptive mode coupling effect.

BPM Models

Standard BPM models are often used to describe wave propagation in integrated optical structures such as optical fibers (see M. D. Feit and J. A. Fleck, "Computation of mode properties in fiber waveguides by the propagating beam method," Applied Optics 19, 1154 (1980)). In the BPM the full transverse distribution of the pump intensity across the core and cladding is computed as a function of the position z along the fiber as described below. The envelope field $\epsilon(r)$ of a laser propagating along an optical fiber (z-axis) can be written as:

$$\frac{\partial \varepsilon(r)}{\partial z} = (i/2k)\nabla_\perp^2 \varepsilon(r) + ik_0 \Delta n(r)\varepsilon(r) - \alpha(r)\varepsilon(r)/2 \tag{20}$$

$$= (i/2k)(\partial^2/\partial x^2 + \partial^2/\partial y^2)\varepsilon(r) + ik_0\Delta n(r)\varepsilon(r) - \alpha(r)\varepsilon(r)/2$$

and the electric field $$E(r) = \frac{1}{2}[\varepsilon(r)\exp[i(kz-\omega t) + c.c.] \tag{21}$$

where, $k = n_0\omega/c = n_0 k_0$, and refractive index $n(r) = n_0 + \Delta n(r)$, and absorption coefficient $\alpha(r)$. Equation (20) can be re-written as $$\frac{\partial \varepsilon(r)}{\partial z} = (D+M)\varepsilon(r) \tag{22}$$

where D and M are operators given by $$D = (i/2k)(\partial^2/\partial x^2 + \partial^2/\partial y^2) \tag{23}$$

and $$M = ik_0 \Delta n(r) - \alpha(r)/2$$

Solutions of Eq. (19) can be written formally as follows $$\varepsilon(x, y, z+\Delta z) = \exp[(D+M)\Delta z]\varepsilon(x, y, z) \tag{24}$$

Note that in general the operators D and M do not commute (DM−MD≠0). However, in the limit where $\Delta z \to 0$, they do commute and Eq. (24) can be rewritten as $$\varepsilon(x, y, z+\Delta z) = \exp[D\Delta z]\exp[M\Delta z]\varepsilon(x, y, z) \tag{25}$$

$$= \exp[M\Delta z]\exp[D\Delta z]\varepsilon(x, y, z)$$

$$= fft2\{\exp[-(k_x^2+k_y^2)\Delta z]ifft2[\tilde{\varepsilon}(x, y, z)]\}$$

with $$\varepsilon(x, y, z) = \exp[M\Delta z]\varepsilon(x, y, z) \tag{26}$$

In Eq. (25) $fft2$ and $ifft2$ denote the Fast Fourier Transformation (FFT) operator and its inverse FFT, respectively. From the electric field value, the intensity and power can be calculated in the fiber according to:

$$P_P(z) = \frac{nc}{8\pi}\int\int |\varepsilon(x, y, z)|^2 dx dy \tag{27}$$

where c is the speed of light and n the refractive index. In contrast to the rate equation models, the BPM model reflects the transformations in the transverse distribution of the fields associated with the pump and signal beams as they propagate along the fiber. In other words, BPM inherently accounts for the absorptive mode coupling effect described above in equations (20) to (26). As applied to EMFAs, a strongly absorbing core ($\alpha>5$ cm$^{-1}$) absorbs the low order pump modes over a very short distance, creating a dip in the initial "flat top" distribution of the pump. This, in turn, leads to strong diffraction effects that couple light into the core as the pump propagates along the fiber, providing higher gain than that predicted from models used to describe silica fibers. These effects are stronger as the core becomes more absorbing.

Figure 12:
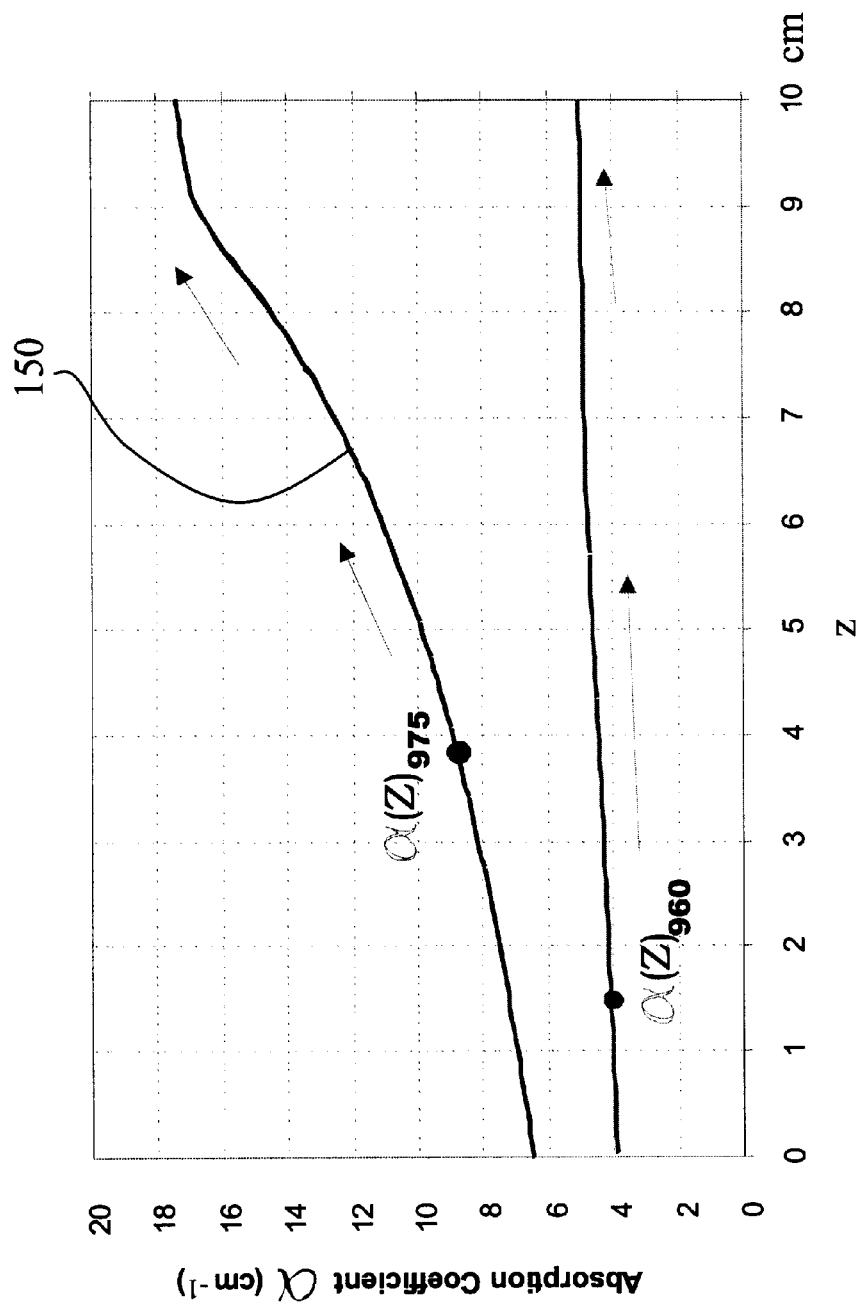
FIG. 12 is a plot of α vs. z illustrating the saturation absorption in the micro fiber.

However, standard BPM assumes that absorption is a constant over the length of the fiber, which is a reasonable assumption for lightly doped silica fibers where $\alpha<1$ cm$^{-1}$. Doya et al. (Opt. Lett. 26, 872 (2001)) have previously included a simplified model of saturation of pump absorption in their modeling of long EDFAs. But, as shown in FIGS. 11 and 12, in EMFAs absorption changes significantly over the length of the fiber due to saturation effects. Thus, the modeling results for standard BPM, as shown in FIG. 7 above, overestimate the absorption efficiency, hence gain for an EMFA.

FIG. 12 shows a plot 150 of $\alpha$ vs. z at 975 nm illustrating the saturation effect in the micro fiber. When the pump power deposited in the core is high at z=0, the glass is saturated and the absorption coefficient $\alpha$ is low. As pump power is rapidly absorbed in the highly doped core, the deposited power is reduced and the absorption coefficient increases. Essentially at low pump power, few of the dopant ions are excited out of the ground state so a pump photon has a higher probability of being absorbed. Conversely, at higher pump powers, which are necessary to get gain out of the fiber, at least 50% of the erbium ions are excited out of the ground state so the probability of absorption is reduced. This same saturation effect is evident in lightly doped silica fibers but the change in $\alpha$ is smaller and is stretched over several tens of meters instead of a few centimeters. Thus, highly doped micro fibers are characterized by rapid changes in $\alpha$ whereas lightly doped silica fibers can be approximated by a constant $\alpha$ within the range of operating powers of the EMFA.

Effective BPM

The present invention provides a new and better model for EMFAs, referred to as the "Effective BPM" that combines the standard BPM model with the modified rate and power equation model. The Effective BPM model requires certain configuration and material parameters as inputs. The configuration parameters include diameters and shapes of the core and cladding diameters and fiber lengths. The material parameters include refractive indices n(r), loss, absorption coefficient $\alpha(r)$, lifetimes, absorption and emission cross sections, erbium and ytterbium concentrations, energy transfer $K_F$, $K_C$, and $K_D$, upconversion coefficients $C_{22}$, $C_{33}$ and $C_{14}$. The shape, diameter and input power of the pump are also inputs to the model. Parameter values are highly dependent upon the particular micro fiber.

Figure 13A:
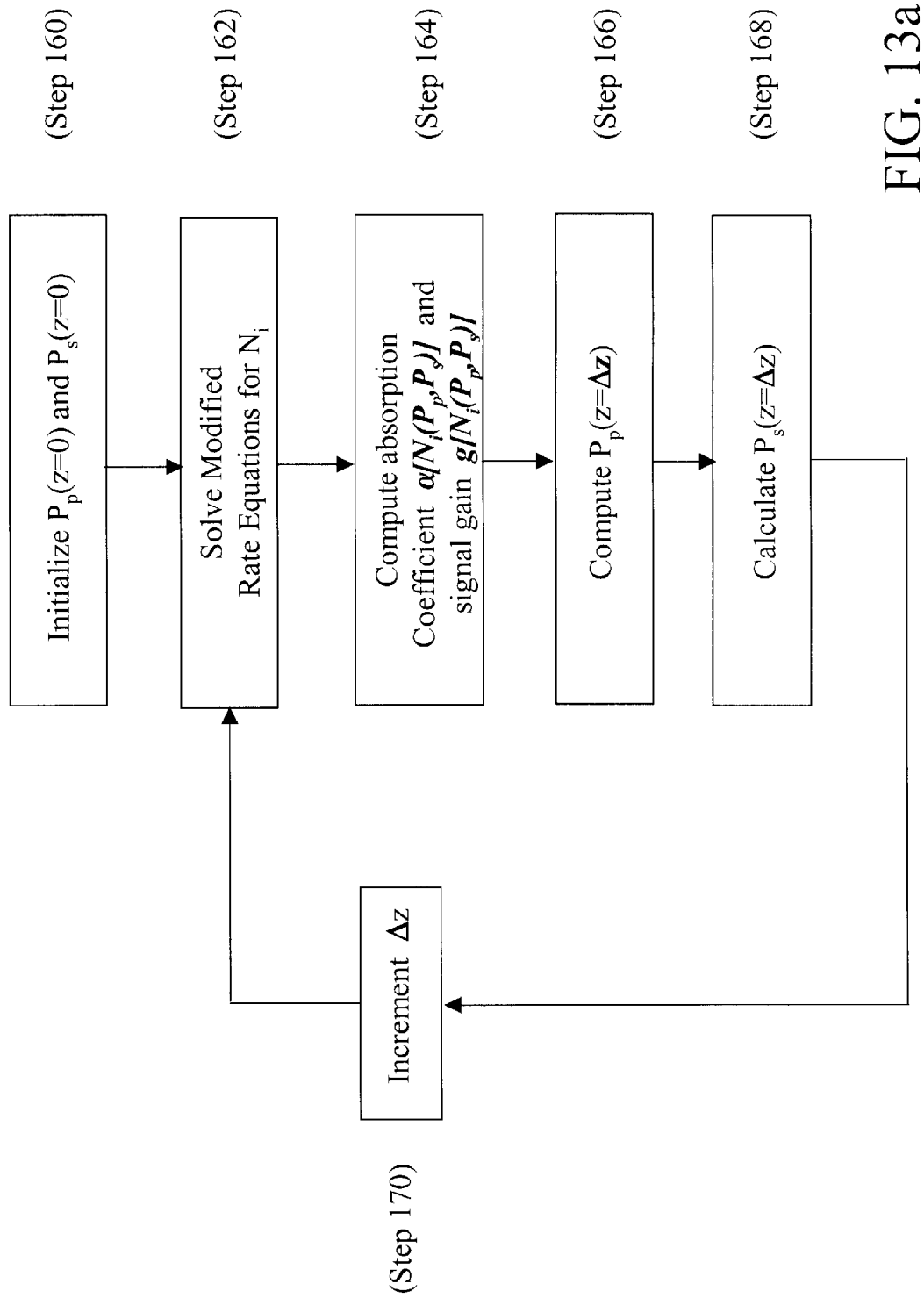
FIGS. 13a and 13b are a flowchart and schematic illustration of an Effective BPM algorithm for modeling the EMFA.
Figure 13B:
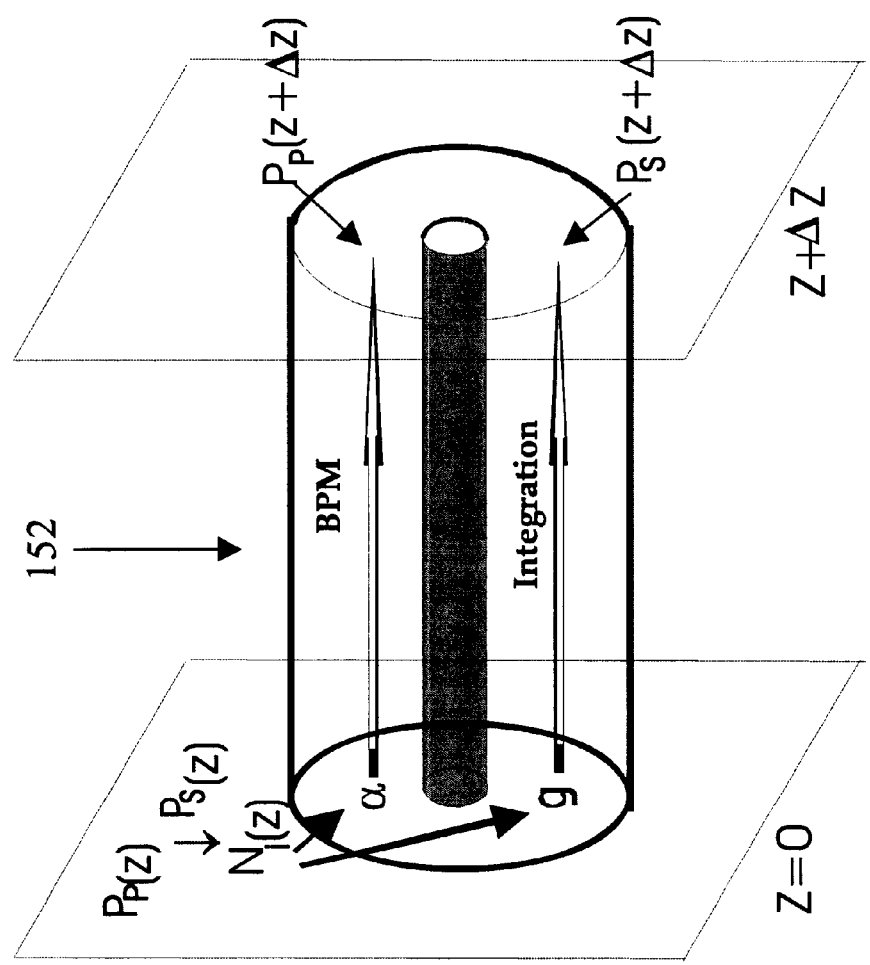

As shown in FIGS. 13a and 13b, the Effective BPM follows the following steps: At the entrance of the fiber 152 (z=0), the transverse distribution of the pump power $P_p(z=0)$ and the signal power $P_s(z=0)$ are taken as input parameters (step 160). The modified rate equations are solved numerically providing values of the local erbium and ytterbium populations $N_i$ at z=0 (step 162). From the local populations, the absorption coefficient $\alpha[N_i(P_p,P_s)]$ for the pump and the local signal gain $g[N_i(P_p,P_s)]$ are computed at this point (step 164). Having given the value of $\alpha[N_i(P_p,P_s)]$ at z=0 (1$^{st}$ iteration), the BPM then computes the transverse distribution of the pump power $P_p$ (z=$\Delta$z) where $\Delta$z is an infinitesimal distance, e.g. 1 micron step (step 166). With the knowledge of the local signal gain $g[N_i(P_p,P_s)]$ the propagation single-mode equation for the signal can be easily integrated numerically providing the signal power at $P_s(z=\Delta z)$ (step 168). With the knowledge of the transverse distribution of the pump power $P_p(z=\Delta z)$ and the signal power $P_s(z=\Delta z)$, the distance is incremented by $\Delta z$ (step 170) and the steps are repeated until the desired fiber length is reached. The Effective BPM outputs the gain spectra and a profile of the pump power.

Figure 14:
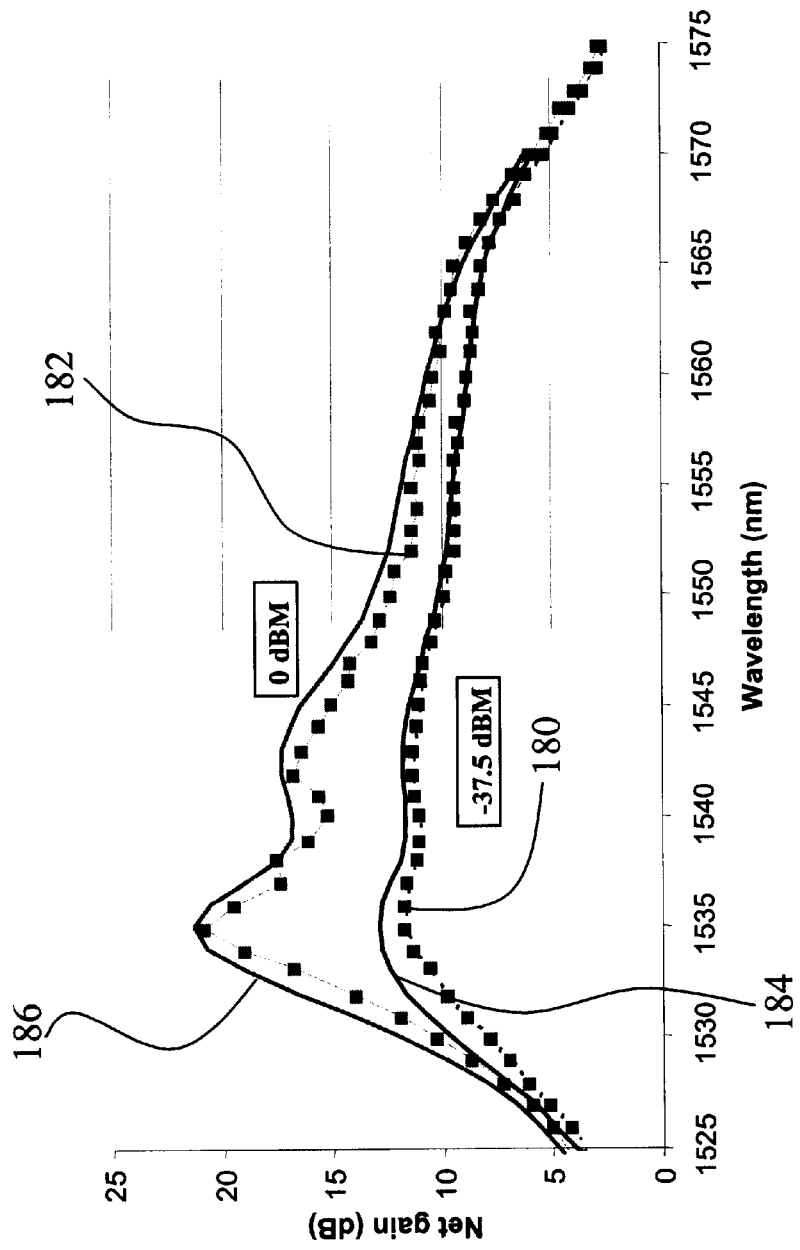
FIG. 14 is a plot of measured and modeled gain curves validating the effective BPM model.

As shown in FIG. 14, the Effective BPM model is powerful at predicting the experimental data measured over the full operating spectrum. The empirical data 180 and 182 for net gain versus wavelength for 0 dBm and −37.5 dBm input signals, respectively, closely tracks the modeled curves 184 and 186 over the entire wavelength spectra. In addition to the gain spectra, the Effective BPM produces the profile of pump power, which can be used to calculate output power, ASE, noise figure and saturation power of EMFAs.

Our experiments and Effective BPM Model calculations clearly show that multi-mode cladding pumped highly absorbing fibers behave completely differently from multi-mode pumped silica based fibers with low Er concentration and low absorption. Specifically, the absorptive mode-coupling effect, which is imperceptible with standard silica fiber, significantly increases pump absorption in highly doped micro fibers. Without this effect, conventional wisdom would dictate that power absorption efficiency in an EMFA would be inadequate to produce the minimum gain per watt needed for a practical amplifier. The amount of pump power that would otherwise be required to pump an EMFA to achieve 10 dB of gain, for example, would be too high for metro applications. The application of absorptive mode-coupling to EMFAs facilitates the use of short fiber lengths in combination with multi-mode pumping, which reduces the fiber cost, fiber management cost, pump cost and reduces the form factor of the amplifier.

Figure 15:
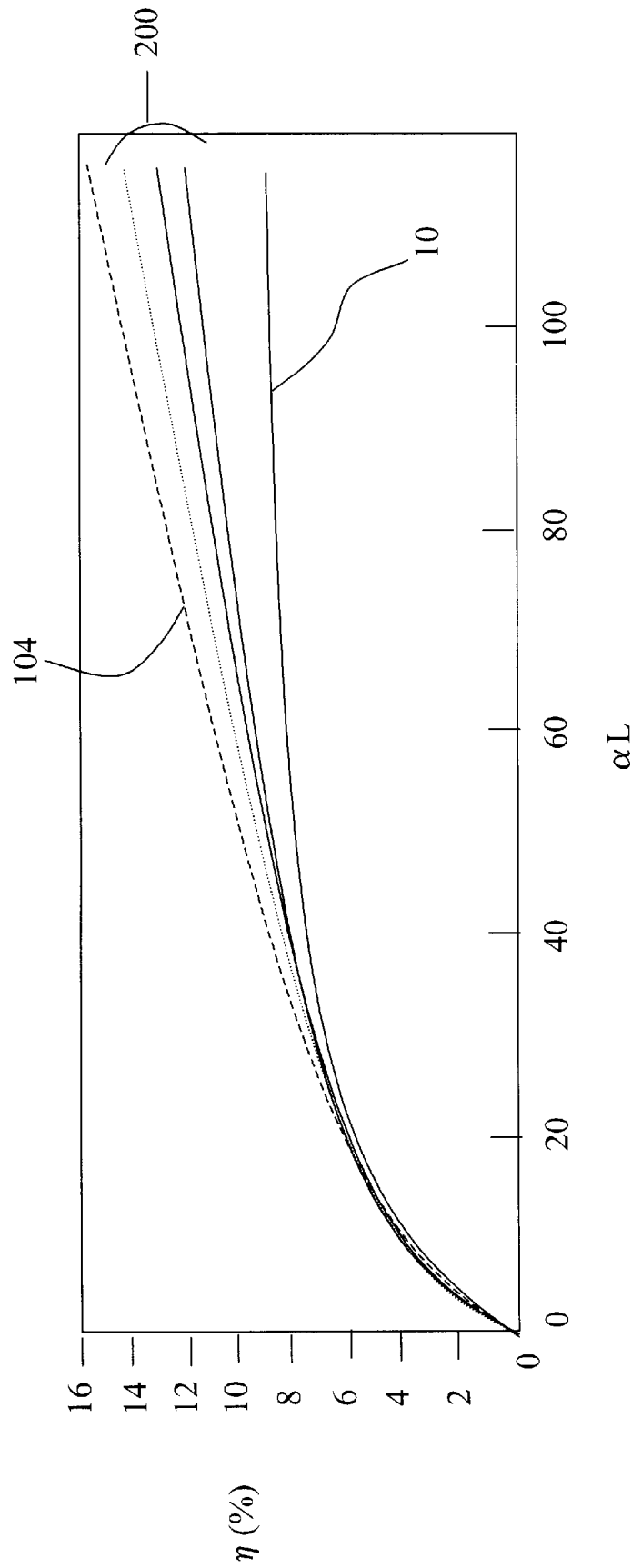
FIG. 15 is a plot of η vs. αL showing absorptive-mode coupling and saturation effects.

As shown in FIG. 15, the nonlinear and saturation effects also modify the $\eta$ vs. $\alpha L$ curve 104 shown in FIG. 7 by somewhat reducing the absorption efficiency predicted by the absorptive mode coupling model. Furthermore, what was considered to be a single universal curve for all $\alpha L$ turns out to be a family of curves 200 that depend on the specific saturation characteristics of the highly doped glasses and the absorption of the cladding glass. Even so, with Yb concentrations of 5 wt. % or higher the absorption coefficient $\alpha$ is at least 5 cm$^{-1}$ at the peak wavelength such that $\alpha L>20$. As a result, the absorption efficiency of a highly doped micro fiber is approximately double that predicted by the conventional model and should achieve a minimum absorption efficiency of ten percent in most configurations. The enhanced absorption found in EMFAs should provide performance of at least 1 dB/cm gain over the C-band (1530–1565 nm) with at most 1 W of optical power coupled into the fiber for micro fibers less than 20 cm in length.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical fiber amplifier, comprising:

A micro fiber of length L less than 20 cm coupled between lengths of single-mode fiber to receive and amplify an optical signal, said micro fiber having a core and an inner cladding of similar multi-component glass compositions with said core being co-doped with 0.5–5 wt.

% erbium and 5–30 wt. % ytterbium to have an absorption coefficient α greater than 5 cm$^{-1}$ at a peak wavelength such that αL>20; and A multi-mode pump laser that emits pump radiation that is coupled into the micro fiber's inner cladding, propagates axially down the micro fiber and is partially absorbed by the doped core causing stimulated emission and amplification of the optical signal.

2. The optical fiber amplifier of claim 1, wherein the multi-component glass comprises a glass network former from 30 to 80 weight percent, a glass network modifier MO from 2 to 40 weight percent, and a glass network intermediator XO from 2 to 30 weight percent, wherein MO is selected from alkaline earth oxides and transition metal oxides consisting of BaO, BeO, MgO, SrO, CaO, ZnO, PbO and mixtures thereof, and XO is selected from PbO, ZnO, WO$_3$, Al$_2$O$_3$, B$_2$O$_3$, Y$_2$O$_3$, La$_2$O$_3$, and mixtures thereof.

3. The optical fiber amplifier of claim 2, wherein the glass network former is selected from one of phosphorus oxide P$_2$O$_5$, germanium oxide GeO$_2$ or telluride oxide TeO$_2$.

4. The optical fiber amplifier of claim 2, wherein the multi-component glass comprises glass network modifier MO from 5 to 40 weight percent, and a glass network intermediator XO from 5 to 30 weight percent.

5. The optical fiber amplifier of claim 1, wherein the total doping concentration of erbium and ytterbium exceeds 10 wt. %.

6. The optical fiber amplifier of claim 1, wherein the micro fiber core is doped with 2 to 5 wt. % erbium and 12 to 30 wt. % ytterbium.

7. The optical fiber amplifier of claim 6, wherein the total doping concentration of erbium and ytterbium exceeds 15 wt. %.

8. The optical fiber amplifier of claim 2, wherein the glass composition has a temperature coefficient of refractive index (dn/dT) from about −2.0×10$^{-6}$ to 2.0×10$^{-6}$ K$^{-1}$.

9. The optical fiber amplifier of claim 8, wherein the glass composition further comprising up to 5 percent by weight of an additional network modifier R$_2$O selected from the alkali metal oxide group consisting of Li$_2$O, K$_2$O, Na$_2$O, Rb$_2$O, and mixtures thereof.

10. The optical fiber amplifier of claim 8, wherein the multi-component glass is an alkali-free glass substantially free of an additional network modifier R$_2$O selected from the alkali metal oxide group consisting of Li$_2$O, K$_2$O, Na$_2$O, Rb$_2$O, and mixtures thereof.

11. The optical fiber amplifier of claims 9 or 10, wherein the multi-component glass further comprises a mixture of network modifiers MO such that said temperature coefficient of refractive index is between about −2.0×10$^{-6}$ to 2.0×10$^{-6}$ K$^{-1}$.

12. The optical fiber amplifier of claim 11, wherein the mixture of network modifiers MO includes a mixture of up to 25.5 wt. % BaO and/or ZnO.

13. The optical fiber amplifier of claim 1, wherein said micro fiber has a circularly symmetric core and inner cladding.

14. The optical fiber amplifier of claim 1, wherein the micro fiber length L is 2–10 cm.

15. The optical fiber amplifier of claim 1, wherein absorption efficiency of pump radiation into the core exceeds 10%.

16. The optical fiber amplifier of claim 1, wherein the multi-mode pump power coupled into the micro fiber is less than 1W, said micro fiber providing at least 1dB/cm of gain for the optical signal over a wavelength range of 1530 nm to 1565 nm.

17. The optical fiber amplifier of claim 1, wherein the micro fiber formed of said multi-component glass exhibits a propagation loss greater than 0.005 dB/cm.

18. The optical fiber amplifier of claim 1, wherein the multi-mode pump radiation consists of lower and higher order modes that are coupled into the inner cladding and propagate axially down the fiber, said high concentration of ytterbium, hence said high absorption coefficient causing said lower order modes that substantially overlap said core to be rapidly absorbed and invert the dopants in a first portion of the micro fiber, said rapid absorption of said lower order modes perturbing said higher order modes so that they are mode coupled into and partially absorbed by the core thereby inverting the dopants in the remaining length of the micro fiber.

19. An optical fiber amplifier, comprising

A micro fiber of length L<20 cm coupled between lengths of single-mode fiber to receive and amplify an optical signal, said micro fiber having a core and an inner cladding of similar multi-component glass compositions with said core being co-doped with erbium and ytterbium to have an absorption coefficient a greater than 5 cm$^{-1}$ at a peak wavelength such that αL>20; and A multi-mode pump laser that emits pump radiation consisting of lower and higher order modes that are coupled into the inner cladding and propagate axially down the fiber, said lower order modes that substantially overlap said core being rapidly absorbed to invert the dopants in a first portion of the micro fiber, said rapid absorption of said lower order modes perturbing said higher order modes so that they are mode coupled into and partially absorbed by the core thereby inverting the dopants in the remaining length of the micro fiber causing stimulated emission and amplification of the optical signal.

20. The optical fiber amplifier of claim 19, wherein core is co-doped with 0.5–5 wt. % erbium and 5–30 wt. % ytterbium.

21. The optical fiber amplifier of claim 20, wherein the multi-component glass comprises a glass network former from 30 to 80 weight percent, a glass network modifier MO from 2 to 40 weight percent, and a glass network intermediator XO from 2 to 30 weight percent, wherein the network former is selected from one of phosphorus oxide P$_2$O$_5$, germanium oxide GeO$_2$ or telluride oxide TeO$_2$, MO is selected from alkaline earth oxides and transition metal oxides consisting of BaO, BeO, MgO, SrO, CaO, ZnO, PbO and mixtures thereof, and XO is selected from PbO, ZnO, WO$_3$, Al$_2$O$_3$, B$_2$O$_3$, Y$_2$O$_3$, La$_2$O$_3$, and mixtures thereof.

22. The optical fiber amplifier of claim 21, wherein the glass composition has a temperature coefficient of refractive index (dn/dT) from about −2.0×10$^{-6}$ to 2.0×10$^{-6}$K$^{-1}$.

23. The optical fiber amplifier of claim 22, wherein the glass composition further comprising up to 5 percent by weight of an additional network modifier R$_2$O selected from the alkali metal oxide group consisting of Li$_2$O, K$_2$O, Na$_2$O, Rb$_2$O, and mixtures thereof.

24. The optical fiber amplifier of claim 23, wherein the multi-component glass is an alkali-free glass substantially free of an additional network modifier R$_2$O selected from the alkali metal oxide group consisting of Li$_2$O, K$_2$O, Na$_2$O, Rb$_2$O, and mixtures thereof.

25. The optical fiber amplifier of claims 23 or 24, wherein the multi-component glass further comprises a mixture of network modifiers MO such that said temperature coefficient of refractive index is between about $-2.0 \times 10^{-6}$ to $2.0 \times 10^{-6}$ $K^{-1}$.

26. The optical fiber amplifier of claim 25, wherein the mixture of network modifiers MO includes a mixture of up to 25.5 wt. % BaO and/or ZnO.

* * * * *